Feb. 5, 1957  A. E. CARLSON  2,780,572
METHOD OF MAKING REINFORCED SHEET MATERIAL
Filed March 3, 1953  9 Sheets-Sheet 1

INVENTOR.
ARTHUR E. CARLSON
BY
HIS ATTORNEY

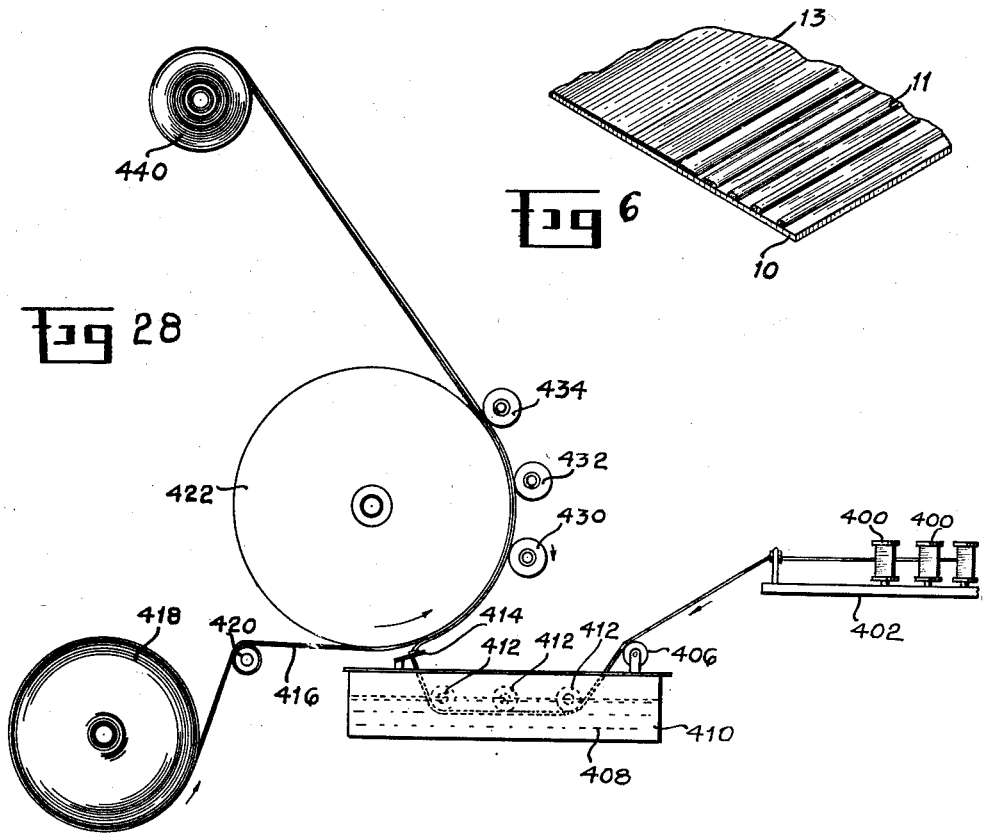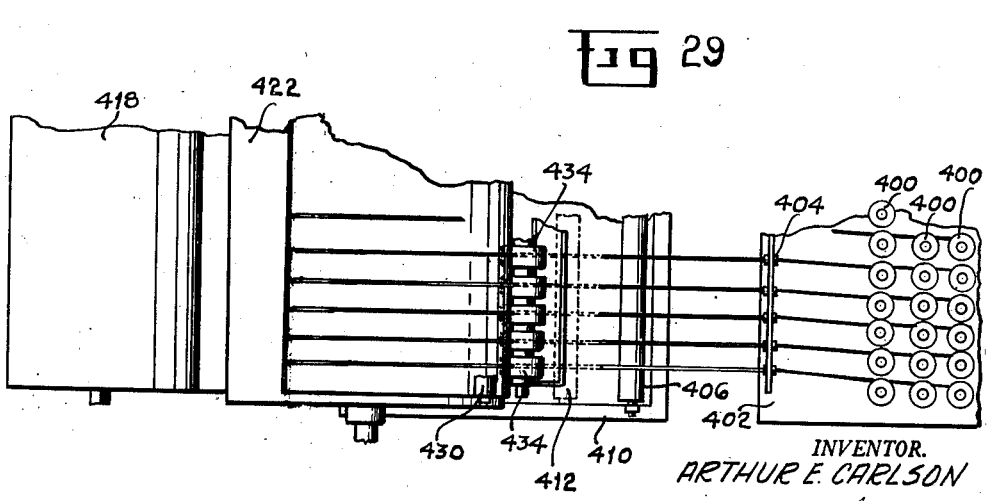

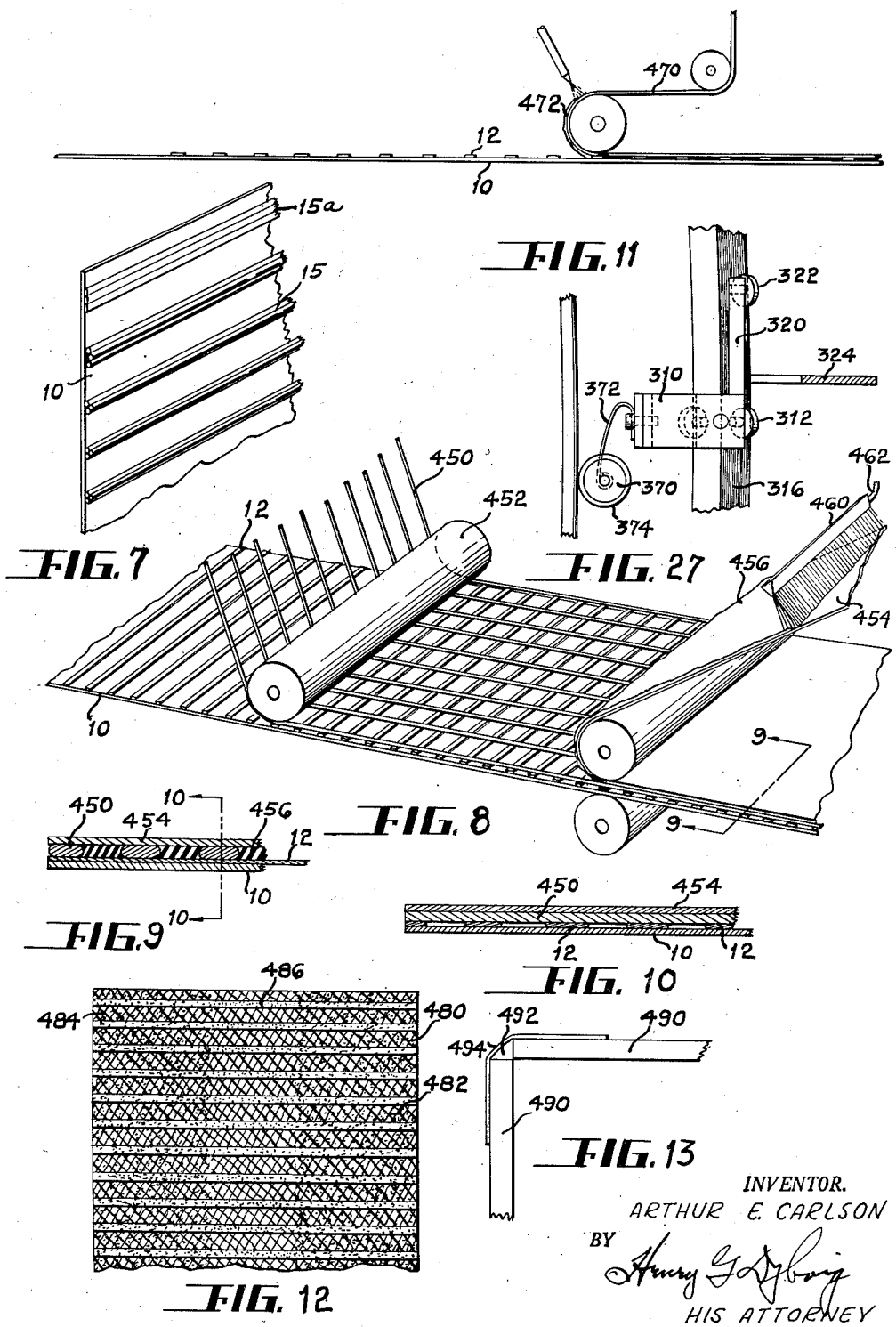

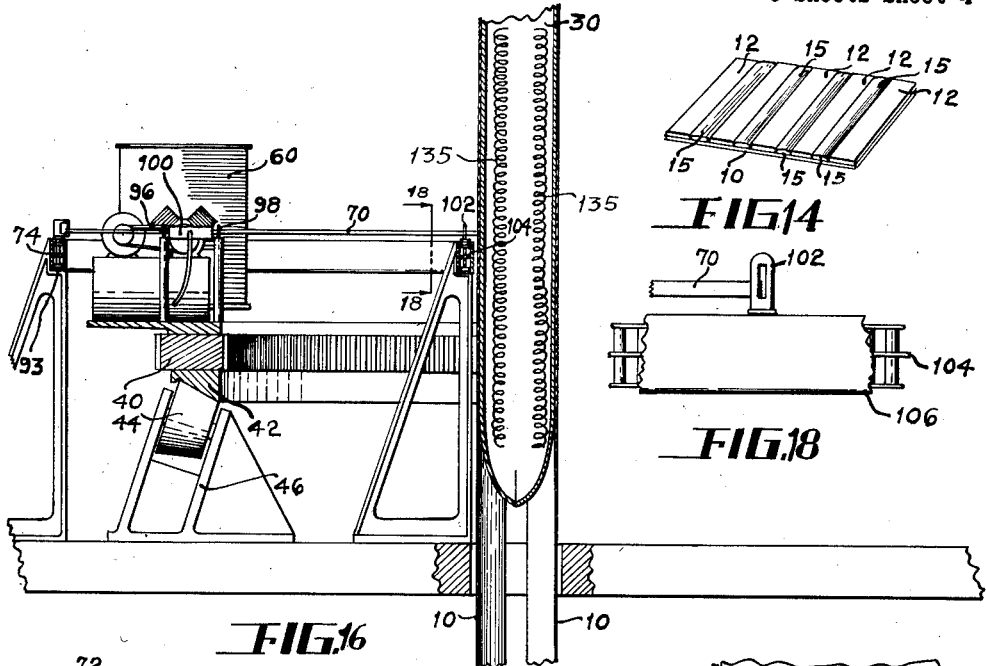
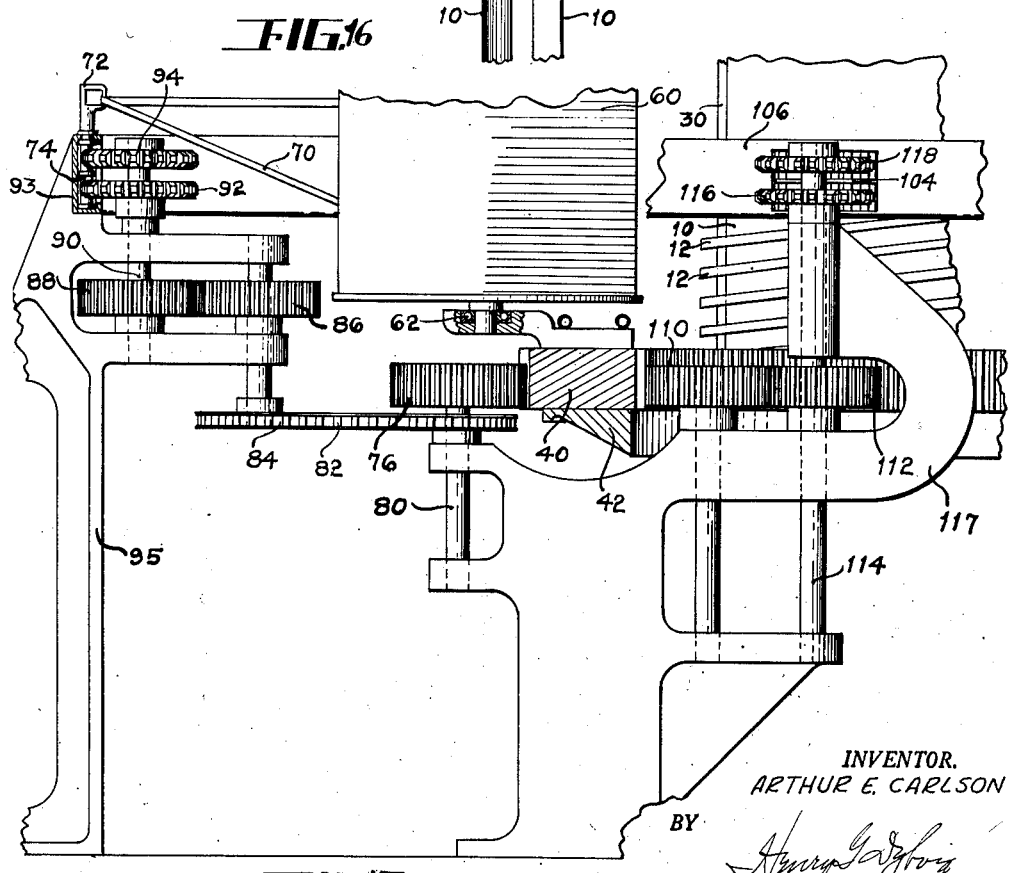

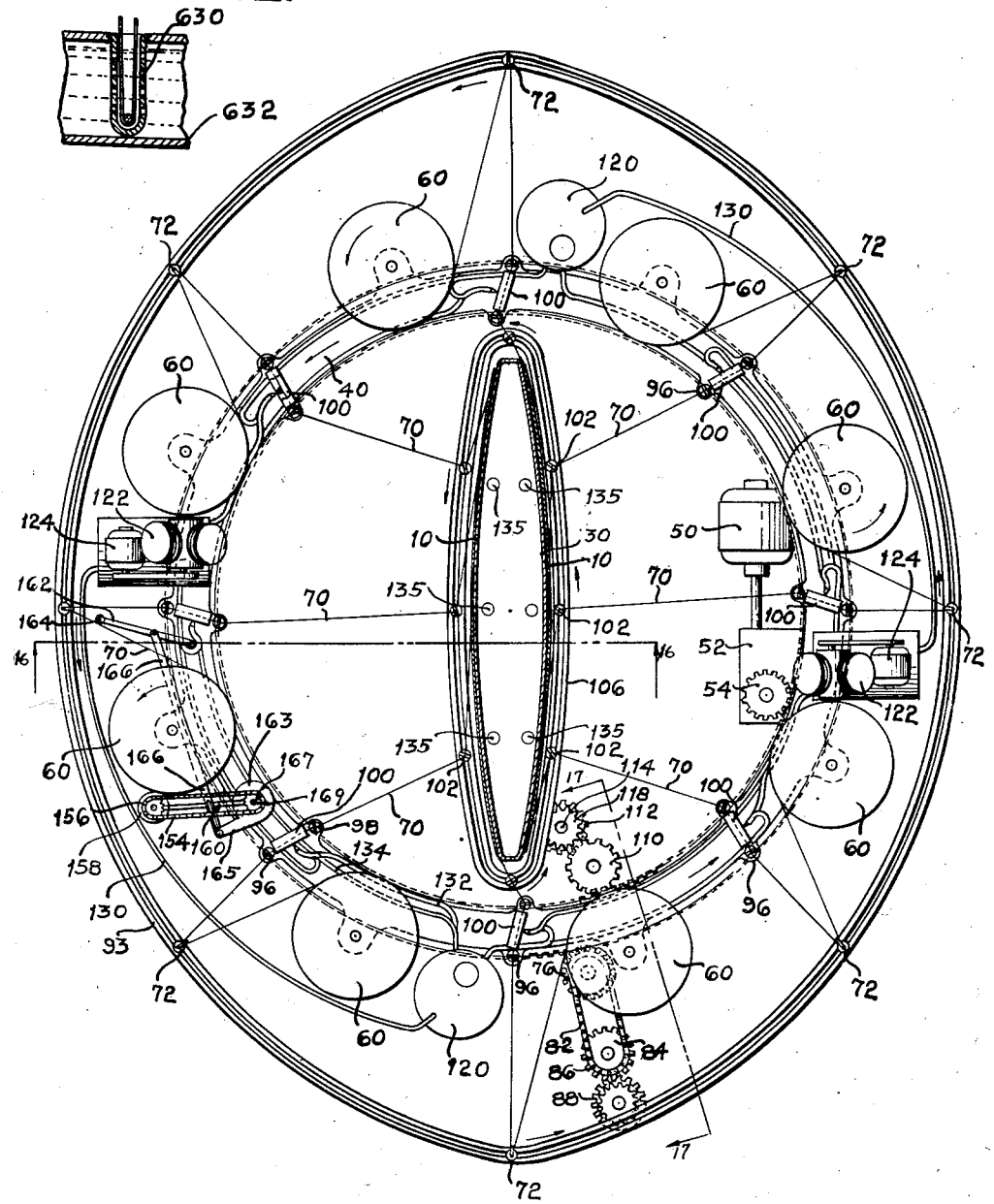

Feb. 5, 1957 A. E. CARLSON 2,780,572
METHOD OF MAKING REINFORCED SHEET MATERIAL
Filed March 3, 1953 9 Sheets-Sheet 6
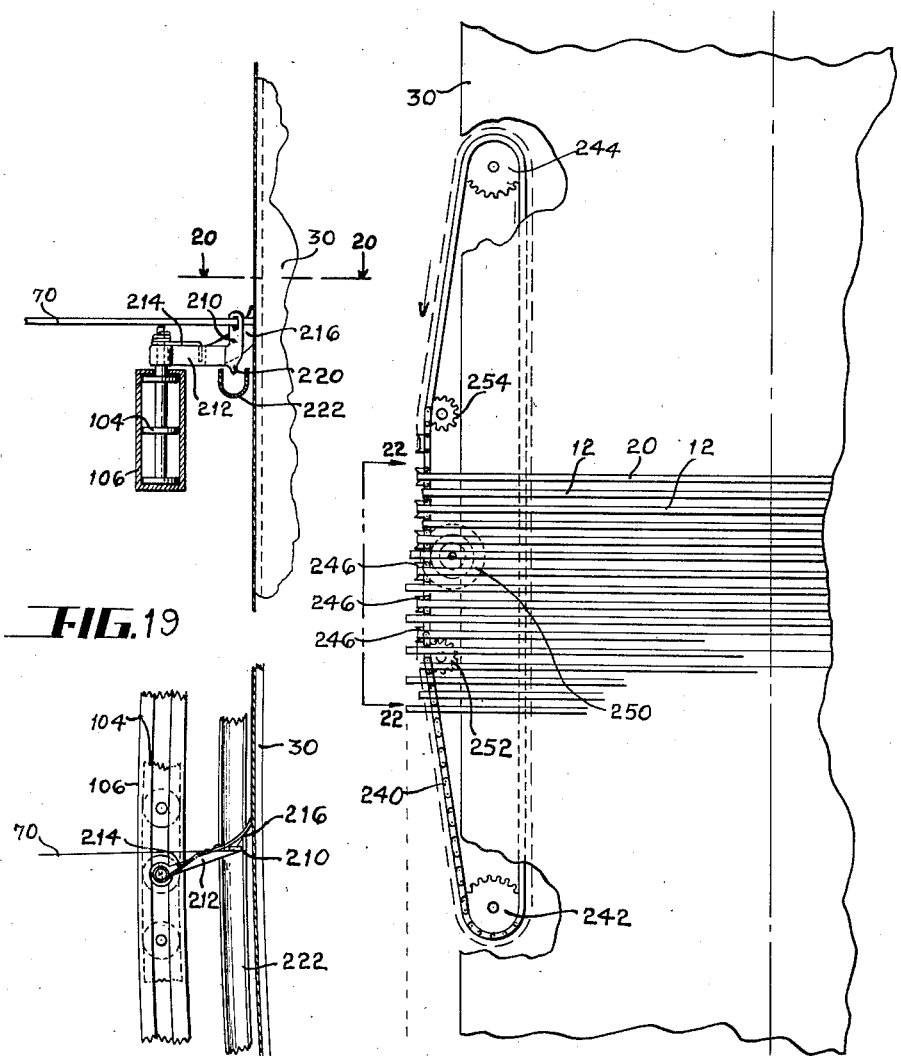
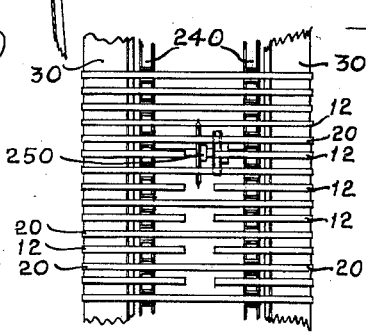
INVENTOR.
ARTHUR E. CARLSON

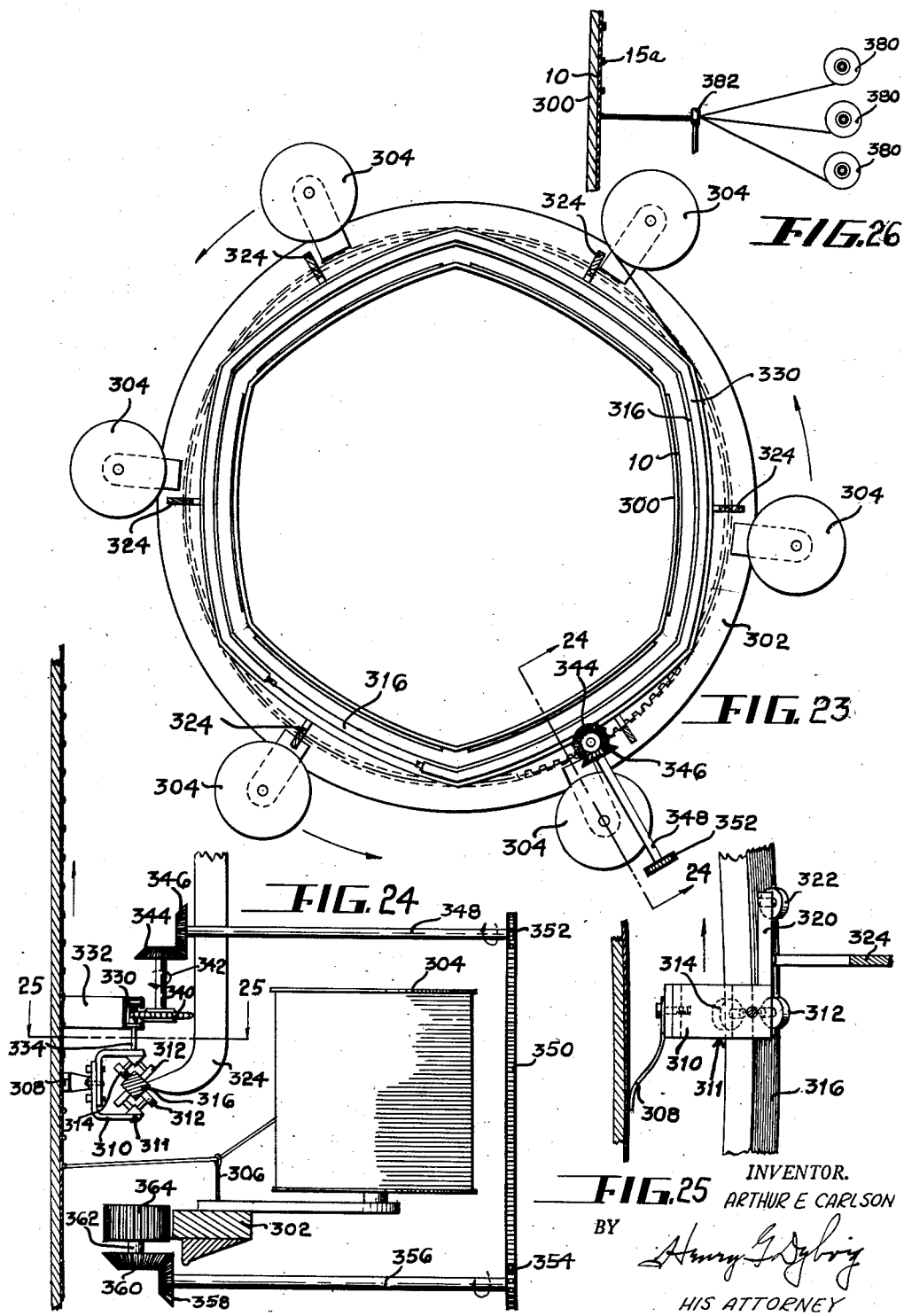

Feb. 5, 1957 A. E. CARLSON 2,780,572
METHOD OF MAKING REINFORCED SHEET MATERIAL
Filed March 3, 1953 9 Sheets-Sheet 8
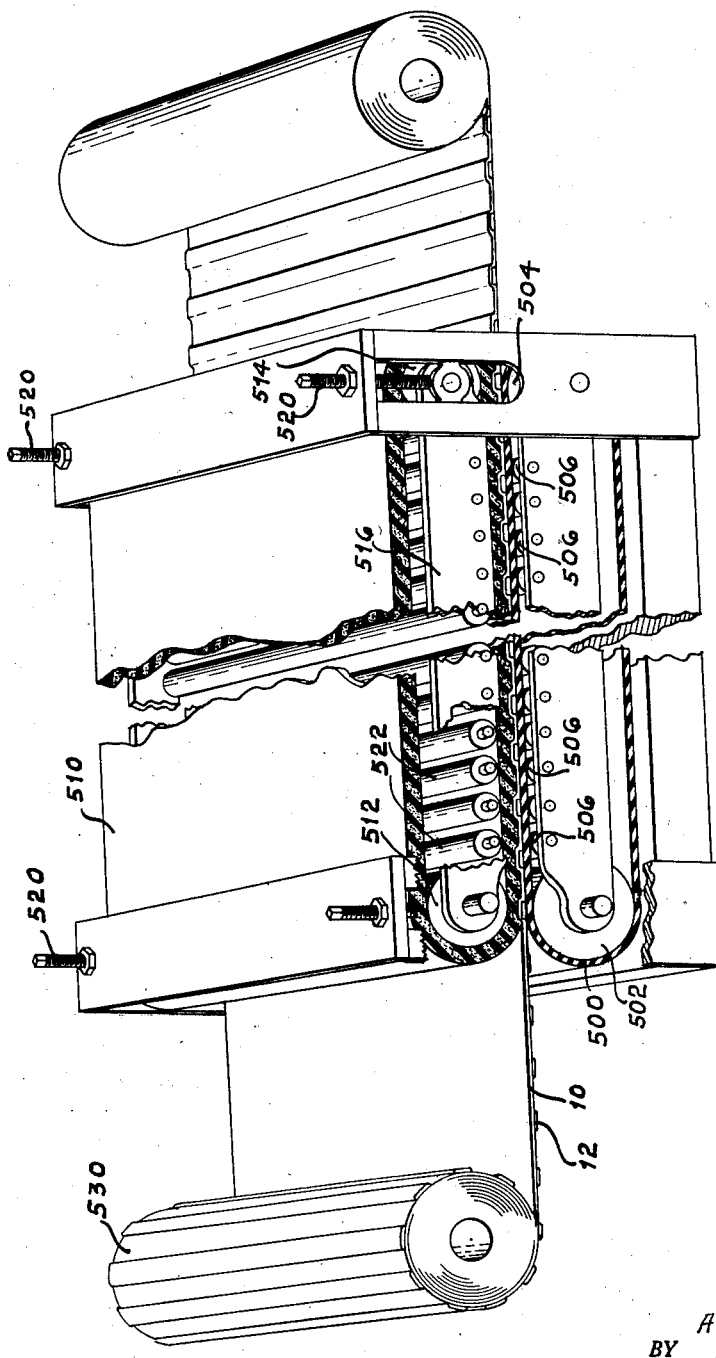
INVENTOR.
ARTHUR E. CARLSON
BY
HIS ATTORNEYS Feb. 5, 1957  A. E. CARLSON  2,780,572
METHOD OF MAKING REINFORCED SHEET MATERIAL
Filed March 3, 1953  9 Sheets-Sheet 9
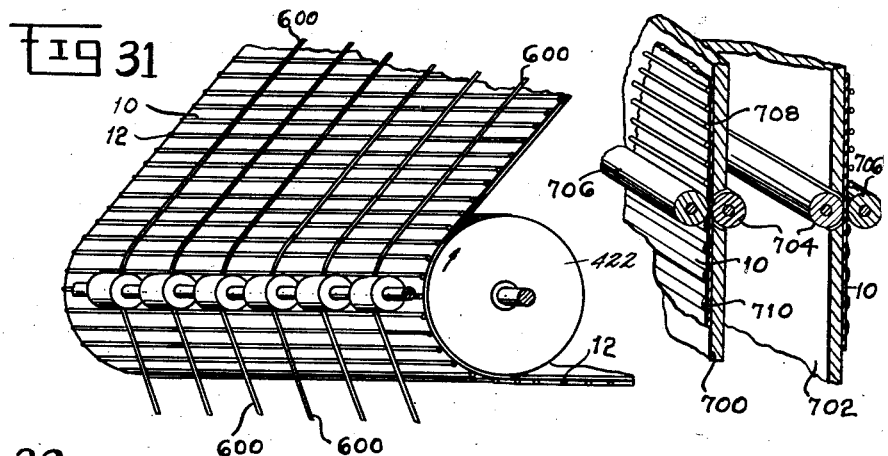
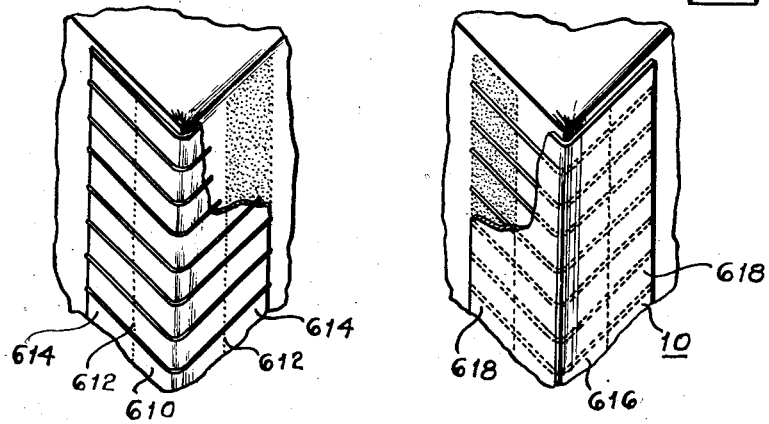
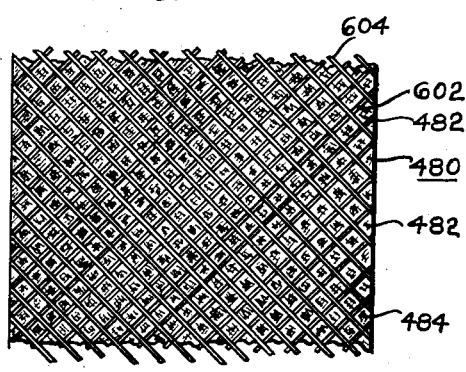
INVENTOR.
ARTHUR E. CARLSON
BY
HIS ATTORNEY—

2,780,572

METHOD OF MAKING REINFORCED SHEET MATERIAL

Arthur E. Carlson, Troy, Ohio

Application March 3, 1953, Serial No. 340,029

5 Claims. (Cl. 154—93)

This invention relates to reinforced sheet material, the apparatus for and method of producing the same.

In the manufacture of various types of standard paper tapes, it is well known that the paper has less tensile strength in a direction transverse to the machine direction of the paper than in the machine direction. For example, the cross direction tensile strength of standard gumming kraft papers is about one-half of the machine direction tensile strength. In the manufacture of stay tape, it is customary to slit strips of paper longitudinally from the supply roll, so that the slitting takes place in the direction parallel to the machine direction of manufacture of the paper. This results in strips of paper that have far less tensile strength transversely than longitudinally; but in stay tape usage, the greatest tensile strength is required in the transverse direction of the tape and very little tensile strength is required in the longitudinal direction. In other words, the maximum strength of the paper has not been effectively utilized. In order to improve upon the strength of stay tape and other products, various reinforcing materials have been used. Among these is the use of reinforcing elements consisting of a plurality of filaments of textile saturated with adhesive and applied to the base sheet at spaced intervals, as disclosed in my United States Letters Patent No. 2,610,936, granted September 16, 1952, for Reenforced Paper Articles, and my copending applications Serial No. 178,434, filed August 9, 1950, now Patent No. 2,718,254, for Apparatus for and Method of Producing Reinforced Sheet Material, Serial No. 179,302, filed August 14, 1950, now Patent No. 2,699,813, for Apparatus for and Method of Producing Reinforced Sheet Material, Serial No. 216,054, filed March 16, 1951, now Patent No. 2,719,804, for Reinforced Sheet Material, Apparatus for and Method of Producing the Same, and Serial No. 294,335, filed June 19, 1952, now Patent No. 2,722,366, for Carton Joint Assembly and Method of Producing Same.

This application is a continuation-in-part of my application Serial No. 294,335, filed June 19, 1952, now Patent No. 2,722,366, granted November 1, 1955, which application Serial No. 294,335 was a continuation-in-part of my application Serial No. 109,482, filed August 10, 1949, now Patent No. 2,610,936, granted September 16, 1952, and of my application Serial No. 216,054, filed March 16, 1951, now Patent No. 2,719,804, granted October 4, 1955.

An object of this invention is to provide reinforcing elements adhered to a blocking sheet of paper, wherein the reinforcing elements are made from strips of paper cut longitudinally and parallel to the machine direction of the paper stock, but with the reinforcing strips being applied to the backing sheet so that the paper reinforcing strips extend in a direction substantially transverse to the machine direction of the backing sheet. The adhesive used in securing the reinforcing elements to the backing sheet may be confined for economy sake to the areas between the backing sheets and the reinforcing elements.

The reinforcing material may be coated on one side with adhesive before the stock, from which the strips are made, has been slit. The adhesive on the one side of the reinforcing strips may then be caused to adhere to the backing sheet by the use of a solvent, such as water or chemical, by the application of heat, or by the application of pressure. Another method of applying the adhesive may include the step of applying the adhesive to one side of the reinforcing strip during the operation of combining the strips with the sheet material. In this case the adhesive may be applied to the reinforcing strip between the source of supply of strip material, such as a roll or a spool, and the work station where the reinforcing strips are applied to the backing sheet. In this last method, the adhesive may be applied to one side of the reinforcing strip by a roller, by capillary attraction, by a spray, by immersion, by means of a tube or in any other suitable manner.

The reinforced paper tape thus produced has a number of advantages, including concentration of tensile strength in the reinforced areas and utilization of the maximum strength found in paper to reinforce the tape transversely, thereby reinforcing the backing strip in the direction in which it is weakest and in the direction where the greatest tensile strength is required. By using strips of paper in this manner, adequate tensile strength may be provided for some applications without the stay tape being too stiff from excess thickness, due to the use of approximately twice as much paper in caliper to obtain an equal cross directional tensile strength. Excess stiffness interferes with good operation of high speed machine taping of cartons. Considerable economy is effected since only about half as much paper is needed to obtain the tensile strength required. Concentration of a given amount of strength where the reinforcing strips are located results in greater resistance to both tension tears and shear tears than if the same amount of paper were spread out and were continuous, being therefore considerably thinner in caliper. Further, once a tear is started in a stay tape, it is desirable to have reinforcing bands or elements to halt the propagation of such a tear. In the preferred construction where applicant uses strips of reinforcing material that are well separated from each other, economy is also effected in the use of the adhesive material for combining the strips with the sheet material, in that the adhesive may be limited to the areas of the backing sheet that are reinforced. In the past, there have been objections raised to a type of stay tape involving a sheet of material with reinforced elements on one side where the stay tape is applied to a carton with the reinforcing elements exposed. The objection was that the exposed reinforcing elements were easily dislodged. By applicant's structure, this objection is adequately met, because a substantially wide surface area is provided for adhesively bonding the strips to the backing sheet so that they will not be dislodged. Furthermore, to meet the most rigorous requirements, moisture resisting adhesives may be used and if desired, wet strength papers or other types of papers that have been treated so as to improve tear resistance and/or abrasion resistance may be used, so that the exposed reinforcing strips of paper would have no objectionable features. The flexibility of the finished product may also be enhanced in this way, because of limiting the laminating adhesive, instead of having it extend over the entire surface area of the finished product.

A variation from the above construction, though a less economical one, may involve a cover sheet over the reinforcing strips to obtain a sandwich-like structure. In such a structure the adhesive for uniting the cover sheet to the reinforcing strips may be limited to the area of the strips, in which case no direct adhesive bond would exist between the bottom and top sheets.

Another modification may involve debossing the reinforced sheet material to obtain a uniformly smooth surface on the reinforced side of the backing sheet, thereby permitting the application of the stay tape to a carton or other surface with the reinforcing strips unexposed.

Another object of this invention is to provide a structure that includes either transversely or longitudinally disposed reinforcing elements consisting of yarns, threads, bands of rayon filaments or the like adhered to the backing sheet and these textile type reinforcing elements are disposed between the reinforcing strips of paper to add further strength. In addition thereto, the textile type reinforcing elements and the reinforcing strips of paper lie so close together as to cooperate to form a comparatively smooth or level surface extending continuously over the backing sheet by virtue of selecting paper strips and textile reinforcing elements of substantially equal caliper. By this arrangement, it is possible to gum the reinforced side of the assembly so as to cause the reinforcing strips and the textile type reinforcing elements to come into direct adhesive contact with the carton or other supporting structure, without a debossing operation being required to obtain the smooth and level surface. This structure is quite advantageous, in that both the front and the rear sides of the tape will be flat and even. For example, it can be wound more easily into compact rolls. Furthermore, the ends of the adjacent pieces of adhesive tape may be overlapped, in that the outer surface of the underlying tape will be flat, so as to permit the overlying tape to be adhesively secured thereto. This is especially a desirable feature for longitudinally reinforced tapes. In the manufacture of this tape, heat activated adhesive may be applied to the base sheet on one side thereof, so that it is merely necessary to superimpose upon the sheet the strips of paper and the textile type reinforcing elements and to apply the necessary heat to activate the adhesive in order to combine the parts.

Certain bags or reinforced papers used for shrouding, for example, where tear resistance and maximum tensile strength in both machine direction and cross direction is required, may well be constructed to incorporate the principles set forth above. In these cases, the reinforcing strips may be employed in both longitudinal and transverse directions. For this purpose a sandwich construction may be used involving top and bottom cover sheets with reinforcing strips of paper aligned within the sandwich, and if it is desired to improve shear tear resistance further, as well as to fill in the voids of such a sandwich structure, reinforcing elements such as yarns, ribbon-like reinforcing elements or the like could be used in between the paper reinforcing strips.

Another object of this invention is to provide methods and apparatus for spreading textile reinforcing elements, consisting of many substantially untwisted members, transversely or longitudinally on a sheet of paper or other sheet material so as to form a wide thin band, whereby intimate contact is provided between the reinforcing elements and the sheet material and whereby the thickness of the reinforcing elements is very small as compared to the width thereof. This may be accomplished by providing one or more pressure instruments, flattening the reinforcing elements before the adhesive material has set or hardened, which pressure instruments may consist of a blade-like element spring-urged against the reinforcing elements, or it may consist of a roller or any other suitable instrumentality. The pressure instrument is preferably covered or coated with a material to which the adhesive will not adhere.

Another object of this invention is to provide a stretchable sheet material that is reinforced with stretchable reinforcing elements so that both the sheet material and the reinforcing elements may yield, to thereby absorb an impact without failure of the sheet material and the reinforcing elements. This may be accomplished by using any stretchable sheet material, such as X-creped paper material that is stretchable in the direction of the reinforcing elements, which reinforcing elements may consist of synthetic filaments such as rayon or nylon, although not necessarily so limited.

Another object of this invention is to provide a stretchable stay tape fastened carton manufacturer's joint that is provided with reinforcing elements adhesively secured along the margins thereof to adjacent portions of a carton, the stay tape being provided with a zone through the center thereof that is not adhesively secured to the walls of the carton, so as to permit tretching of the sheet material and reinforcing elements within elastic limits without failure to allow a stretchable stay tape to stretch so that two or more reinforcing elements can cooperate to stop a tension tearing force which is too strong to be stopped by one reinforcing element. The reinforcing elements may be applied directly against the walls of the carton or the paper or sheet material forming the backing of the reinforcing elements may be applied directly to the walls of the carton with the reinforcing elements exposed, or the stay tape may consist of a laminated assembly having elastic reinforcing elements mounted between the sheets forming the laminate. Either one or both of the sheets may be elastic material, permitting the elastic sheet and the elastic reinforcing elements to spread to absorb an impact force without failure. If one sheet of lamina is not stretchable, it will break instead of stretching with the yarns and the stretchable sheet. Such a construction would be used where a laminate is desired but where sufficient shock resistance is provided by the stretchable yarns plus the stretchability of the one sheet of paper. For some purposes only elastic reinforcing elements may be used, together with conventional kraft paper. In this event, the kraft paper will fail in response to the impact load, but a complete failure of the joint is prevented by the reinforcing elements stretching to absorb the impact. In such a structure, the paper is merely a carrier to get the reinforcing elements to the carton and to facilitate the adhesive bonding of the reinforcing elements to the carton sides.

Another object of this invention is to provide sheet material reinforced with reinforcing elements either arranged in bands or spread sufficiently to form a continuous surface of reinforcing elements, which reinforcing elements may be applied either transversely or longitudinally or both.

Another object of this invention is to provide a transversely reinforced laminated assembly wherein the reinforcing elements are adhesively permanently bonded to one of the sheets with that adhesive being limited to saturating the elements and limited to the area of contact between the elements and the first sheet and wherein a second sheet is laminated to the reinforced side of the first sheet by a suitable laminating material.

Another object of this invention is to provide a reinforced assembly wherein reinforcing elements are applied both transversely and longitudinally to one sheet of material, the reinforcing elements extending in one direction being secured to the sheet material throughout their entire length, the reinforcing elements extending in the other direction being secured intermittently directly to the sheet material.

Another object of this invention is to provide a reinforced laminated assembly wherein reinforcing elements are sandwiched between two or more sheets of material and in which the reinforcing elements are applied in both the transverse and longitudinal directions and in which only the transversely disposed reinforcing elements are adhesively bonded directly to a sheet, whereas the longitudinal elements lie embedded in the laminating adhesive.

Another object of this invention is to provide apparatus for reinforcing a plurality of sheets of material in the transverse direction, wherein the sheets of material are so arranged while the reinforcing elements are being applied that the several sheets of material form a polygon.

Another object of this invention is to provide a device for reinforcing sheet material with groups of thin yarns, wherein the yarns in each group are fed from one or more bobbins or sources of supply through a common guide mechanism to the position where the yarns are applied to the sheet material, the yarns being subsequently spread out over the sheet material so as to form a thin band having a thickness substantially equal to the diameter of the individual yarns.

Another object of this invention is to provide apparatus for and a method of producing the sheet material disclosed above, as will appear more fully from the description that follows.

Other objects and advantages reside in the construction of parts, the combination thereof and the mode of operation, as will become more apparent from the following description.

Figure 4:
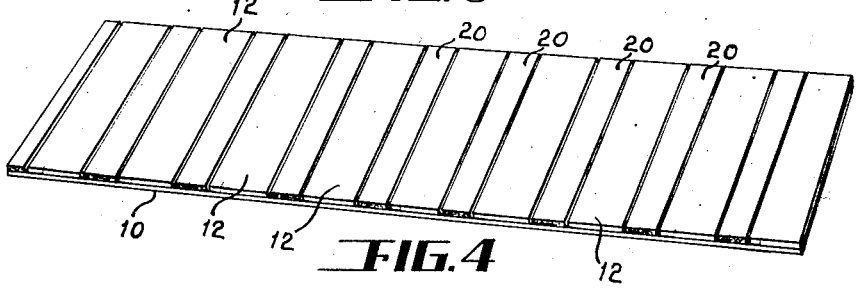

Figure 4 discloses a product involving a sheet of paper reinforced with strips of paper and textile type reinforcing elements, the reinforcing strips of paper and the textile type reinforcing elements being alternated so as to produce a substantially continuous surface on the reinforced side.

Figure 5:
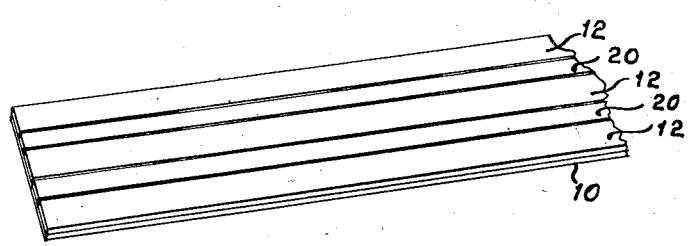

Figure 5 discloses another modification of a longitudinally reinforced tape utilizing strips of reinforcing paper and arranged alternately with ribbon-like bands of textile reinforcing elements.

Figure 6 discloses another modification wherein the reinforcing bands have been spread to form a substantially continuous reinforced surface.

Figure 7 discloses another modification wherein groups of twisted yarns have been applied to one side of the sheet material and then spread out.

Figure 8 discloses a step used in manufacturing another modification.

Figure 9 is a fragmentary, cross sectional view taken substantially on the line 9—9 of Figure 8.

Figure 10 is a fragmentary, cross sectional view taken substantially on the line 10—10 of Figure 9.

Figure 11 is a schematic view showing another step in the process of manufacturing reinforced laminated sheet material.

Figure 12 discloses another modification of sheet material wherein both stretchable sheet material and stretchable reinforcing elements have been used.

Figure 13 is a fragmentary view of a corner of a carton utilizing reinforcing material like that shown in Figure 12.

Figure 14 discloses reinforced sheet material reinforced with at least two different types of reinforcing material.

Figure 15 is a top plan view of apparatus, with parts shown in section, for producing reinforced sheet material.

Figure 16 is a fragmentary, cross sectional view taken substantially on the line 16—16 of Figure 15.

Figure 17 is another fragmentary, cross sectional view taken substantially on the line 17—17 of Figure 15.

Figure 18 is a fragmentary, perspective view showing part in section taken substantially on the line 18—18 of Figure 16.

Figure 19 is another fragmentary, cross sectional view disclosing part of the apparatus disclosed in Figures 15–18 inclusive.

Figure 20 is a fragmentary, cross sectional view taken substantially on the line 20—20 of Figure 19.

Figure 21 is a fragmentary, side elevational view of the platen and the mechanism associated therewith.

Figure 22 is a fragmentary, end elevational view looking substantially in the direction of arrows 22—22 of Figure 21.

Figure 23 discloses a top plan view of a modification.

Figure 24 is a fragmentary view taken substantially on the line 24—24 of Figure 23.

Figure 25 is a fragmentary, cross sectional view, taken substantially on the line 25—25 of Figure 24.

Figure 26 is another fragmentary view of a modification utilizing a plurality of sources of supply, a common guiding means grouping yarns together, applying them to a sheet, and spreading the group into a wide band.

Figure 27 is another fragmentary, cross sectional view disclosing a roller for flattening the reinforcing elements.

Figure 28 discloses another modification for producing longitudinally reinforced sheet material.

Figure 29 is a top plan view of the device disclosed in Figure 28.

Figure 30 discloses a device for debossing sheet material through a low pressure debossing mechanism.

Figure 31 is a fragmentary, perspective view showing the device disclosed in Figures 28 and 29 for manufacturing sheet material reinforced in two directions.

Figures 32 and 33 disclose corners of a carton held together by reinforced sheet material having zones that are not adhesively secured to the carton joint.

Figure 34 is a perspective view of a diagonally reinforced stretchable paper.

Figure 35 discloses a modified platen and pressure roller mechanism for spreading the yarns out before the adhesive is dry.

Figure 36 discloses a fragmentary, cross sectional view of a portion of an adhesive pot or an adhesive tank.

Referring to the drawings, the reference character 10 indicates a backing sheet wherein the machine direction of the paper is parallel to the length of the backing sheet 10. The backing sheet 10 is made from paper, as for example, kraft paper, although not necessarily so limited, in that any suitable paper may be used wherein the machine direction extends longitudinally of the strip. As is well known to those skilled in the art, paper is stronger in the machine direction than in the transverse direction.

In order to acquire the proper transverse tensile strength, the backing sheet 10 is reinforced with a plurality of transversely disposed reinforcing strips 12. These reinforcing strips 12 have been slit from a web or sheet of paper in the longitudinal direction, so that the maximum strength of the reinforcing strips 12 extends in a direction transversely of the longitudinal axis of the backing sheet 10. In the process of reinforcing the sheet material, wide sheets of paper may be fed over a mandrel in a direction parallel to the machine direction of the sheet of paper. Then continuous lengths or strips of reinforcing material 12 may be adhesively applied to one side of the sheet fed over the mandrel or the operating station. The adhesive is preferably confined to the areas between the packing sheet 10 and the reinforcing strips 12. For example, a 35# sheet of paper 10 may be fed over the mandrel and a 90# paper, that has been slit into strips, applied to sheet 10. The tensile strength transversely across the reinforced assembly will be equal to the transverse tensile strength of the sheet 10 and the combined machine direction tensile strength of the reinforcing strips 12. For example, let it be assumed that the reinforcing strips 12 are ¼" wide and are spaced ¼" apart. The reinforcing strips 12 will then have a combined width equal to ½" for every inch length of the sheet 10. In testing one particular kraft paper, it was found that the tensile strength in the machine direction of 90# kraft paper is 76#. One-half inch width would then be 38#. Furthermore, a 35# paper that was tested was found to have a transverse tensile strength of 16# per inch. The total transverse tensile strength of one inch of reinforced material will then be 54#. This is more than the transverse tensile strength per inch of 120# kraft paper. The weight, however, of the reinforced structure is only 80# per ream, so a saving of approximately 50% of paper used can be effected without sacrifice of strength where needed.

A series of tests were made upon different weights of kraft paper obtained from the same source, wherein the following results were obtained:

| Weight of Paper Per Ream, pounds | Tensile Strength, pounds | |
|---|---|---|
| | Machine Direction | Transversely of Machine Direction |
| 35 | 33 | 16 |
| 60 | 57 | 25 |
| 70 | 68 | 27 |
| 90 | 76 | 35 |
| 100 | 80 | 40 |
| 120 | 102 | 44 |

This has been cited merely as an illustration to show that in these particular samples the maximum tensile strength in the machine direction was twice or more the maximum strength in the direction normal to the machine direction. In other types of paper similar results may be anticipated, although very likely would not be identical. If, for example, 90# paper of the type set forth above is used as stay tape, the maximum tensile strength transversely of the stay tape would be 35#. By utilizing a 35# backing sheet and reinforcing this with strips ¼" wide spaced ¼" apart, which strips are slitted from 120# paper, the strength of the stay tape in a transverse direction would be 16# plus 51#, or 67#. The total weight would then be 95#. Thus, it is seen that the 95# stay tape, using transversely disposed reinforcing elements as described above would have a transverse tensile strength of 67# as compared with 35# by using 90# paper in the conventional stay tape or 40# by using 100# paper in the conventional stay tape. The width of the reinforcing elements 12 and the spacing thereof is dependent upon the relative costs, both the manufacturing cost and the cost of the materials used. The wider the reinforcing strips and the closer the spacing, the greater will be the transverse strength; but, at the same time, the cost of the adhesive material increases. Again, this is dependent upon the type of adhesive material used and the requirements thereof.

Figures 1, 2:
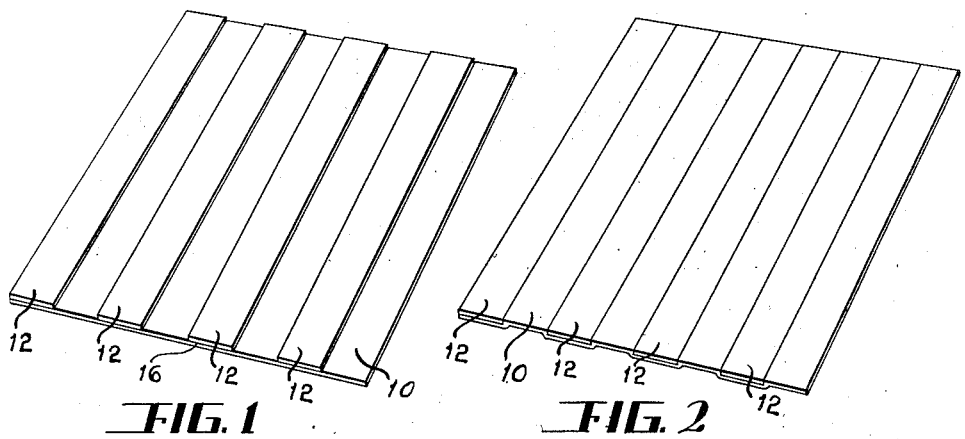
Figure 1 is a perspective view of a reinforced sheet of material.
Figure 2 is another perspective view disclosing the reinforced material after it has been debossed, so as to present a uniform surface on the reinforced side that may be used as a gumming surface and for applying to a carton.

For some types of reinforced sheet material, especially if it is to be used as stay tape, it may be desirable to apply the gumming adhesive to the side of the paper having the reinforcing elements, so as to bond the reinforcing elements directly to the surfaces to be held in position. When this is the requirement, it may be desirable to deboss the sheet material. This may be accomplished by subjecting the sheet assembly to pressure and the application of moisture, the amount of pressure and the amount of moisture depending upon the equipment available, the quality of the finished product, et cetera. For example, if the reinforcing tape shown in Figure 1 is wetted, the reinforced sheet material may be placed between two surfaces, one of which is hard and the other resilient, the reinforcing elements being placed in contact with the hard surface, and low pressure upon the yieldable surface will deboss the sheet material permanently, if the moisture is substantially removed, as by drying, before the pressure is released. When the sheet material has been debossed, as shown in Figure 2, the surface containing the reinforcing element is uniform throughout, that is, the surface of the sheet material between the reinforcing strips and the surface of the reinforcing strips are flush. This permits the application of the gumming material to the side of the reinforced sheet having the reinforcing elements, so that when the tape is used, the reinforcing elements are cemented directly to the body to which the tape is applied. This prevents scuffing of the reinforcing elements and protects the adhesive which bonds the strips to the backing sheet from the weather. In the event the backing sheets splits, which at times occurs, the reinforcing strips would be strong enough to hold the parts together. The finished product, whether debossed or not, is more flexible than one considerably thicker sheet of paper of equal cross direction tensile strength and more flexible than a laminate of a plurality of sheets of paper of equal cross directional tensile strength that have their greatest strength in the direction of their length.

Figure 3:
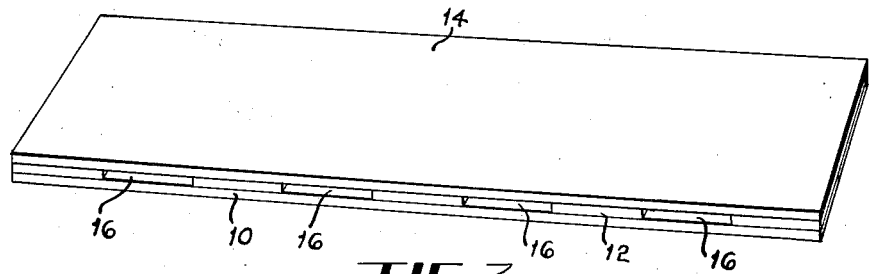
Figure 3 is a cross sectional view of a laminated sandwich structure.

In the modification disclosed in Figure 3, a base sheet 10 and reinforcing elements 12 have added thereto a cover sheet 14 secured in position by adhesive 16, the adhesive 16 being applied to the reinforcing strips 12. This results in economy in the use of adhesive material used in laminating the sheets and it results in a structure that is somewhat more flexible than if adhesive material were applied throughout the entire surface area of sheets 14 and 10.

The reinforced tape disclosed in Figures 1 and 2 has reinforcing strips or ridges on one side of the finished product. For some purposes it is quite desirable to have a reinforced tape that is provided with a flat surface on both sides. Such tape could be used instead of binding twine, rope or heavy cord, to tie together bundles or bales of material that are easily torn or mutilated, as for example, large bundles of paper bags, rolls of wall paper, reams of paper for use in printing or for stationery. A tape that very aptly serves this purpose has been disclosed in Figure 4. In this modification a base sheet 10, which may be identical to the base sheets described above, is provided with paper reinforcing strips 12, which may also be identical to those described in connection with the preferred embodiment. Between adjacent pairs of reinforcing paper strips 12, textile type reinforcing elements, such as yarns, threads, bands of filaments, or the like, are placed. The textile type elements 20 may have a width substantially equal to the distance between the reinforcing elements 12, so that the top surface, as well as the bottom surface of the assembly is substantially flat. If this material is used as a gummed tape, either side may be gummed. For some purposes the upper side, as disclosed in Figure 4, would form the gummed surface, so that the paper reinforcing strips and the reinforcing elements or ribbons would be bonded directly to the taped article. In the manufacture of this material, ribbon-like bands of rayon filaments might be used and then these might be saturated with an adhesive material, so that the rayon filaments are bonded to each other and to the backing sheet 10. The adhesive bonding the rayon filaments may also form a bond to the abutting edges of the strips 12.

By placing the reinforcing strips of paper, as shown in Figure 5, in parallel rows, extending parallel to the longitudinal length of the backing sheet 10 and then laying the reinforcing elements 20 between these reinforcing strips 12, narrow tapes having high tensile and excellent shear tear resistance may be produced for wrapping and tying. Then either side may be placed against the material to be wrapped, the side of the reinforcing material contacting the wrapped material consisting of an unbroken surface. Thus, a band may be applied to the material that is wrapped, the width of the band reducing the possibility of the edges of the tied material being cut or mutilated. This tape or ribbon may be substituted for cord or twine in tying large bundles of paper bags, wall paper and other products that are easily injured by sharp tying materials.

One side of the backing sheet may be coated with a heat activated adhesive material, so that it is merely necessary to apply the reinforcing strips and ribbons to the side of the backing sheet having the adhesive material and to activate the adhesive by heat to bond the parts together.

Referring to Figure 6, the base sheet 10 has applied thereto a plurality of bands 11 of spreadable reinforcing material, so that as the reinforcing material is spread uniformly over the surface, a substantially uniform surface 13 is obtained. Adhesive material may be applied to this surface whenever the finished product is to be adhesively secured in position. The thickness of the layer of reinforcing material may be controlled by the spacing of the reinforcing bands and the size thereof. By utilizing closely spaced large bands, a very heavy layer of reinforcing material may be provided.

In Figure 7, instead of using hundreds of tiny filaments that are spreadable to a very small thickness, a group of tiny twisted yarns have been applied to the sheet 10. These yarns may be spread so as to lie substantially side by side, as shown by the bands 15a in Figure 7. This Figure 7 discloses only three yarns or members for illustration, whereas in practice considerably more would be used, as for example, ten to twenty members. Although this schematic figure does not show it, in the practice of guiding a group of tiny yarns and applying the group to a surface and then spreading the group out in width, some yarns will overlie other yarns, due to twist of the group of yarns in the act of removing the ends from the supply packages and/or in the act of guiding the group of yarns from the supply packages to the surface to be reinforced. So, in reducing the thickness of the group of yarns to a minimum, it is expected there will be areas where the band will be thinner than others.

A machine for producing reinforced material described above will now be described and disclosed in Figure 15. This machine includes a mandrel 30. It may be substantially oval or elliptical in shape. The mandrel may consist of two halves, the longitudinal axes of which extend parallel to each other or they may extend obliquely to each other, as disclosed in my copending application Serial No. 178,434, filed August 9, 1950, for Apparatus for and Method of Producing Reinforced Sheet Material. The base sheets 10 are fed downwardly or upwardly, as the case may be, over the mandrel, there being one base sheet on each side. For the purpose of description, the base sheets are fed downwardly over the sides of the mandrel. This mandrel may be supported in any suitable manner. It may be provided with heater elements for heating the surface of the mandrel to accelerate the drying or the curing of the adhesive material used in manufacturing the reinforced sheet assembly and in the event a thermoplastic or thermosetting adhesive is used, the heated mandrel may then be used to soften the plastic molding material so as to cause the reinforcing strips to adhere to the surface of the base sheet of paper, as will appear more fully later.

A gear ring 40, provided with both internal and external gear teeth, surrounds the mandrel 30. This gear ring 40 is provided with an annular support 42 fixedly attached thereto and mounted for rotation upon a plurality of rollers 44, frustum-conical in shape and supported for rotation in brackets 46 mounted upon a suitable base or upon the floor supporting the machine. This arrangement permits the gear ring 40 to be rotated around the mandrel and the sheets of material. The gear ring 40 is driven by a suitable electric motor 50 through a suitable gear reducing unit 52 driving a pinion 54 meshing with the internal teeth of the gear ring 40. Whether the pinion 54 meshes with the internal teeth or the external teeth is a matter of choice.

This gear ring 40 supports a plurality of spools, tubes or rolls 60 of reinforcing material. As best seen in Figure 17, each spool 60 is mounted upon roller bearings 62. The reinforcing strip or tape 70 is fed from the rolls or spools 60 through a peripherally disposed substantially D-shaped guide member 72 mounted upon a double chain 74. The double chain 74 is driven from the ring gear 40 through a gear 76 keyed to a shaft 80 and having keyed thereto a sprocket wheel driving a chain 82. The chain 82 drives a sprocket 84 driving a gear 86 meshing with a gear 88 keyed to a shaft 90 and driving a pair of sprocket wheels 92 and 94. The gears 86 and 88 are journalled in a bracket or standard 95. It can readily be seen that as the ring 40 rotates, it drives the gear 76 and this in turn drives the chain 82, which rotates the gears 86 and 88, driving the shaft 90 having mounted thereon the sprockets 92 and 94, the chain 74 rotating in the same direction and the same R. P. M. as the gear ring 40. The chain 74 is mounted in a guide track 93 that is elliptical in shape, as best seen in Figure 15. This guide consists of a channel in which the double chain travels.

The reinforcing strip 70 passes from the guide member 72 inwardly through a guide 96 mounted on the gear ring 40, as best shown in Figures 15 and 16, through a second guide 98 also mounted upon the gear ring 40.

A spray booth 100 is mounted between the guides 96 and 98 and supported upon the gear ring 40. This spray booth rotates with the gear ring 40 and so do the guides 96 and 98. The reinforcing strip 70 is then fed towards the mandrel and passes through a guide 102 supported upon a double chain 104, guided through a channel guide 106 that has a contour similar to the contour of the mandrel. The channel guide 106 is mounted in close proximity to the mandrel, so that the guide 102 travels in a path near the base sheets. Each of the strips 70 passes through a guide 102 near the base sheets, so that the distance between the guide 102 and the point of tangency where strips 70 touch the sheet's surface remains constant. Therefore, the strips are withdrawn from their sources of supply at a substantially constant rate excepting as they are affected by the shape of the mandrel not being circular while the spools rotate in a circular path. Further means for obtaining a constant rate of removal of strips 70 from the spools 60 will be described more fully later.

The chains 104 are driven from the gear ring 40 meshing with a gear 110 meshing with a second gear 112 keyed to a shaft 114 having fixedly attached thereto a pair of sprocket wheels 116 and 118, as best seen in Figure 17. The gears 110 and 112 and the shaft 114 are mounted in a standard or bracket 117, which, incidentally, also supports the gear 76 described above, as clearly shown in Figure 17. As the ring 40 rotates, the chains 74 and 104 are driven in synchronism therewith. The gear ratios between the gear ring 40 and the chains 70 and 104 are such that the chains 74 and 104 complete one revolution when the gear ring 40 makes one revolution. The strips 70 are wrapped upon the paper fed downwardly over the mandrel 30. The path of the chain 104 guided through the channel guide 106 is determined by the shape of the mandrel. It is necessary in a high speed operation that the reinforcing strips 70 be withdrawn from the spool 60 at a substantially uniform rate of speed, so the rotation of the heavy supply package of strip material can be smooth and free of starts and stops, and so substantially uniform tension is maintained on strip 70 so that it will not be broken. Due to the fact that the spools 60 travel through a circular path and the application of the reinforcing strips to the paper takes place along an oval or substantially elliptical path, it is necessary to cause the reinforcing elements to travel through a path to compensate for the difference in shape of the circular path of the spools and the outside contour of the mandrel. The outer oval track 92 has been so designed that the distance of any one reinforcing element during any one revolution from its spool 60 to the guide member 72 plus the distance from the guide 72 to the guide 96, plus the distance to the guide 98, plus the distance to the guide 102 and plus the distance from guide 102 to the point of tangential contact of the strips with the base sheet, is substantially constant throughout the revolution of the ring.

In the event the reinforcing strips 70 are coated with a heat responsive material, the guides 96 and 98, the spray booth 100 and the guides 102, together with the inner chain and its associated parts, may be eliminated. In that event, the guide 92 for the chain mounted therein supporting the guide 72 is then so designed that the distance from the supply package or roll 60 to the guide 72, plus the distance from the guide 72 to the point of contact of the backing sheet 10, is constant throughout the winding operation.

The reinforcing strips 70 are adhesively secured to the sheet material or backing sheets 10. The adhesive may be confined to the areas between the reinforcing strips and the backing sheets 10. This may be accomplished by applying adhesive material to one side of the strips 70. As stated above, this may be accomplished in one of several ways. If the adhesive is applied to the sheet material from which the strips 70 have been slit, it will be necessary to activate the adhesive material in some manner unless a pressure sensitive adhesive material or the like is used. A preferred method involves a heat sensitive adhesive that has been pre-coated on strips 70. An example of a desirable type of adhesive is the so-called instantaneous grab-type. In this case the mandrel may be heated by electrical elements 135 in Figure 15, so that upon contact of strips 70 with the backing sheets, a firm adhesive bond is assured.

In the event a solvent is to be applied, such as water or a chemical such as isopropanol, it is applied when the strips 70 pass through the spray booth 100, or through a U-shaped passage in an apertured tube 630 projecting into a glue pot or tank 632, as shown in Figure 36. The solvent is found in a pair of containers or reservoirs 120 diametrically mounted upon the ring gear 40. They have been so mounted in order to reduce vibration. In order to supply air pressure, a pair of compressors 122, also diametrically mounted upon the ring gear 40 and driven by electric motors 124, are used to force the solvent in the form of a spray against one side of the strips 70. The compressors 122 are connected by means of conduits 130, one to the one reservoir 120 and the other conduit to the other reservoir 120. The solvent is supplied to the spray booths by means of suitable conduits 132 and the air pressure is supplied to the spray gun, if a spray gun is used, through the conduits 134.

In the event the strips have not been pre-coated with an adhesive material, the adhesive is applied in the form of a spray in the spray booth. The strips 70 are then fed to the base sheets through their respective guides.

In the device shown for the purpose of illustration, eight spools and eight strips of reinforcing material have been shown, also eight sets of guides and eight spray booths. The number of spools is a matter of choice. Likewise, the size of the spools depends on the particular arrangement. The larger the spools of reinforcing strips, the longer each cycle of operation may continue without interruption. When large and heavy spools are used, it is necessary to provide a power drive for each of the spools. In Figure 15 a power drive is shown in connection with one spool. The power drive includes a driven shaft 169 driven at a rate of speed commensurate with the velocity of the gear ring 40. This shaft drives a sprocket wheel 167 over which a drive chain 154 passes to drive a sprocket 156 connected to a friction wheel 158 journalled in the end of an arm 160 spring urged towards the surface of the reinforcing material on the spool 60. By this arrangement it is possible to maintain a constant peripheral speed of the reinforcing material on the spool, which speed should be substantially the same feet per minute as the feet per minute of reinforcing strips 70 that are wrapped around the mandrel 30.

A tensioning device for tensioning the reinforcing strips 70 and for absorbing the slack therein includes an arm 162 that is pivotally mounted upon the gear ring 40. This arm 162 rotatably supports at its outer end a roller 164. A torsion spring, not shown, is used to actuate the arm 162 so as to cause the roller 164 to tension the strips 70, there being one tensioning device for each of the strips 70.

A link mechanism, including a link 166, pivotally interconnects the arm 162 and an arm 165 through a lost motion mechanism. The arm 165 releases a clutch 163 used in connecting the sprocket wheel 167 to the drive shaft 169. By this arrangement, it can readily be seen that when a slack of a predetermined magnitude accumulates in the strips 70, which slack is absorbed by the roller 164 mounted upon the arm 162, the link 166 releases the clutch 163 so as to disconnect the friction wheel 158 from the driving mechanism. The only force supplied then to the spool or roll 60 is the pull of the strips 70. When the slack is absorbed, the clutch 163 will again be engaged, so as to cause the friction wheel 158 to again drive the rolls 60 until a slack again develops sufficient to release the clutch.

In the manufacture of the tape disclosed in Figure 4, one-half of the rolls 60 will contain paper strips 70 and the other half will contain a supply of textile elements 20 that are laid in position. The rolls containing the paper strips 70 are alternated with the rolls containing the textile reinforcing elements 20. In order to apply adhesive to the ends of textile material, it may be desirable to immerse them in adhesive by drawing them through an adhesive tank such as shown in Figure 36. There may be a separate adhesive pot for each textile yarn or more than one yarn may pass through the same adhesive pot.

When the reinforcing elements 20 are applied, there is a tendency for the reinforcing elements, after the adhesive has been applied, to gather into a circular contour. That being the case, it is quite desirable to flatten the textile elements into a ribbon-like formation immediately before or immediately after they are applied to the paper 10 on the mandrel. In order to flatten the elements before htey are applied to the paper, this has been accomplished by the device disclosed in Figures 19 and 20. Later on a method and apparatus for spreading the reinforcing elements out immediately after they contact the paper is described. In this modification, instead of utilizing the guide 102, a guide 210 is used. This guide 210 is mounted upon an arm 212 pivotally attached to the chain 104 in the channel-shaped track or guide 106. The arm 212 is biased in a clockwise direction, as viewed in Figure 20, towards the mandrel 30 by a torsion spring 214. A wiper blade or reinforcing strip applicator 216 may be attached to the arm 212, so as to press the reinforcing material against the backing sheet mounted on the mandrel 30. This definitely fixes the distance between the guide 210 and the mandrel. Furthermore, the blade or applicator 216 presses the reinforcing elements against the paper to make the elements thin and wide and to insure a good firm bond between the reinforcing strips and the sheet material. The spring 214 applies a constant pressure to the applicator 216.

The guide 210 is provided with a downwardly projecting spout 220 located above the trough 222, so that any excess adhesive material on the reinforcing element is fed into the trough where it may be reclaimed. In the event textile elements are used in the form of a ribbon-like band, the guide 210 has been so designed that the cross sectional area of the opening in the guide is substantially equal to the total cross sectional area of the reinforcing elements, so that even though the reinforcing elements tend to be drawn together in a compact mass after leaving the spray booth, due to the surface tension of the adhesive material and possibly other factors, the reinforcing elements are spread out into a ribbon-like formation by the contour or shape of the orifice or opening in the guide 210. This orifice has the form of a slot that is long and narrow, thereby producing a ribbon-like band applied to the paper backing sheet. Furthermore, the applicator or blade 216 will exert a pressure against the surface of the filaments or the ribbon-like band, so as to cause the reinforcing elements to present a smooth outer surface 13, as clearly shown in Figure 6.

If reinforcing elements are used that tend to contract when the adhesive sets or cures, the reinforcing elements will cause a binding action on the mandrel. This has been overcome in the disclosure in the modification shown in Figures 21 and 22. In this modification a pair of chains or flexible bands 240 are mounted in the margin between the two halves of the mandrel 30. These chains or bands pass over sprocket wheels or spur gears 242 and 244 driven by a suitable mechanism not disclosed. The rate of speed or the velocity of the flexible bands 240 is synchronized with the rate at which the reinforcing elements are applied.

In the event paper reinforcing strips and textile reinforcing elements are used, the paper strips do not contract as much as some types of textile elements, as, for example, continuous length rayon elements. Every other link of the chain 240 is provided with a bridge-like extension or projection 246. In the event the textile filaments are made from a material such that they contract upon the adhesive material being cured, the textile filaments 20 will then be passed over the bridge-like projections 246 found on every other link of the chain, so as to provide a slack in the textile ribbon-like bands, so as to permit the contraction thereof without providing a like slack in the paper reinforcing elements 12. In order to remove any binding action on the part of the reinforcing paper strips, these paper strips may be severed by a rotary cutter 250 mounted between the chains or flexible bands 240 and driven in any suitable manner, so as to cut the paper reinforcing elements without severing the textile reinforcing ribbon-like bands 20.

The flexible band or chain 240, in addition to passing over the sprockets 242, also passes over a pair of idlers 252 and 254. This is to cause the flexible band or chain 240 to travel in a path projecting beyond the margins of the mandrels 30. The idlers 252 and 254 have been provided so as to provide sufficient slack in the reinforcing strips or bands. Furthermore, shortly after the reinforcing elements have been positioned, the flexible band or chain 240 moves at an angle towards the sprocket 242, so as to release the tension on the reinforcing textile elements to permit these to shrink until the adhesive sets sufficiently, at which time they may be severed by a suitable cutter that has not been shown.

The use of the flexible chain or band 240, in addition to providing a slack in the reinforcing elements, also prevents the reinforcing elements from binding along the margins of the mandrel. The flexible members 240, traveling in synchronism with the rate of speed at which the reinforcing elements are applied, eliminate the binding of the reinforcing elements along the margins of the mandrel, thereby expediting the feeding of the sheet material over the mandrel with the greatest of ease.

The distance that the flexible band or chain 240 moves outwardly from the margin of the mandrel has been greatly exaggerated in Figure 21 for the purpose of illustration. The idlers 252 and 254 are preferably adjustably mounted to permit adjustment towards and away from the margins of the mandrel as may be required. Likewise, the distance between the two chains or flexible members 240 has been exaggerated in Figure 22 for the purpose of clearness. These chains are located in close parallel paths in actual operation. The only clearance required between the two chains or flexible bands 240 is sufficient space for the operation of the rotary disc cutter 250. Although only one pair of chains or flexible bands has been shown, both margins of the mandrel are each provided with one or more chains or flexible bands.

In some of the figures disclosing the apparatus, such as Figures 21 and 22, the reinforcing elements 12 and 20 have been shown as comparatively narrow bands with spaces between them. This has been done for the purpose of illustration. In actual practice the reinforcing elements 12 and 20 are of such a width as to practically cover the entire sheet of paper when both types are used.

In the event yarn 15 is to be positioned between the strips, as shown in Figure 5, one-half of the rolls are provided with reinforcing strips of paper and the other half with yarn. If yarn is used, the openings in the spring-urged arms 212 may be designed to partially flatten the yarn 15 into a flat contour, as clearly shown in Figure 5.

In the preferred embodiment of the apparatus, a two-sided mandrel has been shown wherein two sheets are reinforced simultaneously. In order to increase production and in some respects simplify the apparatus, the mandrel may consist of a plurality of sides for feeding a plurality of sheets, as clearly shown in the modification disclosed in Figures 23 to 25. In this modification, a six-sided mandrel 300 has been shown for feeding six sheets 10. Surrounding the mandrel is a ring gear 302 similar to the gear 40 disclosed in the preferred embodiment and supported in a similar manner. This ring gear supports a plurality of supply packages or bobbins 304 of reinforcing material. Although the sides of the polygon of Figure 23 are shown to be arcuate, they may be flat instead.

Due to the fact that the adjacent sides of the mandrel form an obtuse angle approaching 180°, it may not be necessary to compensate for variations in the rate at which the reinforcing elements are withdrawn from the bobbins 304. In the event the number of sides is increased sufficiently to provide a substantially circular mandrel, the reinforcing material is withdrawn at a uniform speed during normal operating conditions. The reinforcing elements may be fed through a suitable eye 306 supported on the ring gear 302 and, if necessary, through a spray booth as disclosed in connection with the preferred embodiment or through a glue pot, as disclosed in my application Serial No. 178,434, filed August 9, 1950, or the glue pot disclosed in application Serial No. 179,302, filed August 14, 1950, so as to apply adhesive to the reinforcing elements. Instead of a single adhesive trough as disclosed in the applications referred to above, a number of adhesive pots could be used as long as they rotate with the yarn supply packages. This is shown in Figure 36 in one type of structure. In the event the reinforcing elements already contain adhesive material that is pressure responsive or that may be activated, it is not necessary to feed the reinforcing elements through a source of supply of adhesive material.

In order to spread the reinforcing elements immediately after they are applied to the paper, an instrument is provided which may include a spreader blade 308, disclosed in Figure 25, or a roller 370, disclosed in Figure 27, supported upon a pair of angle brackets 310 forming a framework for the carriage 311 supporting rollers 312 and 314 riding upon a stationary track 316 that may be substantially square in cross sectional area. This track may be shaped to extend substantially parallel to the sides of the mandrel 300. A uniform pressure is applied to the reinforcing elements throughout the entire periphery of the mandrel. Due to the fact that the blade 308 or roller 370 exerts a pressure against the reinforcing elements, it can be readily seen that there would be a tendency for the carriage to rotate in a counterclockwise direction, as viewed in Figure 25, about the rollers 312 and 314, so as to cause the instrument to move out of contact with the reinforcing elements. In order to offset this torque, an arm or pair of arms 320, each supporting a roller 322, contact the surfaces of the track 316 that are farthest removed from the mandrel, so as to firmly hold the spreader instrument against the reinforcing elements throughout the entire periphery.

The track 316 is supported upon a plurality of mounting brackets 324. These mounting brackets 324 are supported upon a stationary support (not shown) located a considerable distance above the ring gear 302 or below the ring gear, depending upon the relative position of the track 316 with respect to the ring gear.

In order to cause the carriages 311 to travel around the mandrel, a drive mechanism for the carriages has been shown. This drive mechanism includes a chain 330 guided through a guide track or rail 332. The upper bracket 310 of each of the carriages 311 is secured to the chain 330 by a suitable shaft-like member 334. The chain 330 is driven by a sprocket wheel 340 keyed to a shaft 342 driven by a bevel gear 344 meshing with a pinion 346 keyed to the shaft 348 actuated by a chain 350 passing over a sprocket wheel 352 keyed to the shaft 348 and over a sprocket wheel 354 keyed to a shaft 356 driven by a pinion 358 meshing with a bevel gear 360 keyed to a suitable shaft 362 driven by a gear 364 meshing with the internal gear teeth of the ring gear 302. The shafts 348, 356 and 362 are mounted in suitable bearings that have not been shown, in that in Figure 24 merely a schematic showing of the driving mechanism has been shown. A second chain drive may be placed below the carriages and secured thereto in like fashion, to remove the possibilities of the carriage wheels binding on the track.

It can be readily seen that as the ring gear 302 rotates and is driven by the drive mechanism described in connection with the preferred embodiment, the chain 330 will be driven and the carriages connected with the chain 330 will be driven therewith. The relative speed of the chain 330 with respect to the ring gear 302 depends upon the gear ratio of the driving mechanism. The chain 330 may be driven at the same speed and in the same direction as the ring gear 302. The spreader blade 308 may spread some of the adhesive in the reinforcing elements laterally, so as to coat the adjacent areas of the backing sheet 10. By applying the proper amount of adhesive, it is possible to completly cover the areas between the reinforcing elements with the adhesive supplied by the reinforcing elements. Thus a coating process and a reinforcing process are combined into a common process.

Instead of using a spreader blade as disclosed in Figure 25, a pressure roller 370, disclosed in Figure 27, mounted upon a resilient support 372 may be used. This pressure roller 370 is preferably covered by suitable material, as for example, a plastic 374, sold in the trade under the trademark "Teflon," that has almost no affinity for certain types of adhesive material, as for example, adhesive materials having a latex base. The spreader blade 308 may also be protected by a coating of "Teflon" or some other suitable material that does not have affinity for the adhesive material. The support member 372 is mounted upon a carriage substantially identical to the carriage 311 described in connection with the disclosure in Figure 25.

The device disclosed in the modification shown in Figures 23 to 25 may reinforce a number of sheets of material for each revolution of the supply packages, thereby increasing the rate of production and at the same time providing a device wherein the sides of the mandrel form almost a continuous surface, so that the rate of withdrawal of the reinforcing elements is substantially constant.

In the event it is found desirable to feed a plurality of threads or yarns in groups, as shown in the modification disclosed in Figure 7 and Figure 26, a plurality of supply packages 380 may be substituted instead of the supply packages 304, so as to feed a plurality of yarns as a group to be applied to the sheet material. The yarns advance from the supply packages 380 through an eye member 382 and, if necessary, through a suitable source of adhesive material to cause the yarns to adhere as a group to the sheet material. These yarns are subsequently spread by the spreader blade 308 or by the spreader roller 370, as disclosed in Figure 27, so as to spread the yarns side by side as shown at 15a in Figure 7. Although only three supply packages and only three yarns have been shown, the number of supply packages and the number of yarns in each group is a matter of coice. In actual practice the number of yarns would probably be greatly increased, so as to obtain the desired characteristics. Each yarn is preferably of a very small diameter, so that the ultimate thickness of the reinforcing elements 15a is not objectionable. For example, fine twisted yarns of from 50 to 100 denier or so, may be used. In short, if tiny twisted yarns are used in sufficient number, wide thin bands can be produced which make excellent reinforcing elements.

In the modification disclosed in Figures 28 and 29, the sheet material is provided with reinforcing bands extending parallel to the sheet material. In this modification, a plurality of supply packages 400 consisting of bobbins or spools or reels of reinforcing material are supported upon a stationary support 402. The reinforcing elements are fed through suitable guides 404 over a roller or bar 406 downwardly into adhesive material 408 in a suitable vat 410, the reinforcing elements being guided through the adhesive by a plurality of rollers or a bar 412, then upwardly through metering device 414 into contact with the sheet of material 416 fed from a suitable roll 418 over roller 420 and around a platen roller 422. The distance from the metering device 414 to the roller is quite small. Furthermore, the openings in the metering device may be such that the reinforcing elements are partially spread out laterally before being applied to the sheet material.

A plurality of pressure rollers 430, 432 and 434 are used to spread the reinforcing elements in width and to reduce the thickness thereof beyond the surface of the paper. These rollers 430—434 may also be covered with "Teflon" or some other suitable material that has low affinity for the adhesive material used. Instead of three rollers extending the full width of the sheets, a number of small spring-urged rollers may be used where each small roller spreads one or more yarns. The reinforced sheet material is then fed in strip form for a sufficient distance, so as to cure the adhesive material before it is wrapped or wound into a roll 440 where it may be stored until it is used. In passing from the platen roller 422 to the winding roll 440, the reinforced sheet material may be passed through a suitable adhesive curing device, as for example, a drying oven. Although a wide sheet is reinforced, this sheet may be slitted into narrower tapes of the desired width.

Instead of applying the longitudinally extending reinforcing elements as shown in Figures 28 and 29 to a plain sheet of material, the sheet material may already have had transverse reinforcing elements bonded to it, so that by adding longitudinal elements, a two-way reinforced sheet may be made, as disclosed in Figures 8, 9 and 10, and by adding a cover sheet of material 454, such as paper, a laminated reinforced assembly may be made. In this modification, the base sheet 10 has had reinforcing elements saturated with adhesive and then applied transversely to the sheet, so that these elements 12 are bonded permanently to sheet 10 by adhesive that is limited to the area of contact between elements 12 and sheet 10. The reinforcing elements 12 may be continuous strips of paper or they may consist of bands consisting of a plurality of filaments laid substantially side by side or may consist of bands consisting of a plurality of twisted yarns laid substantially side by side. The sheet 10, having the reinforcing elements applied thereto, may then have loosely superimposed thereon longitudinally extending reinforcing elements 450 laid down by roller 452 from suitable sources of supply, not shown. The sheet of material 454 may have applied to one side thereof adhesive material 456 and may then be superimposed upon the sheet 10 having reinforcing elements 12 secured thereto and the strips 450, so as to form a laminated structure. These elements 450 become embedded in the laminating adhesive 456 but do not come in direct contact with either sheet 10 or 454.

The second set of reinforcing elements (the longitudinal ones) may also be applied by the apparatus of Figure 28 after the transverse elements have been bonded to the first sheet of paper. If the apparatus in Figure 28 is used for applying the longitudinal yarns on top of the transversely bonded yarns, the longitudinal yarns do become permanently adhered to that first sheet of paper intermittently between the transversely placed yarns as well as becoming adhered to the exposed surfaces of the transverse yarns. Then a cover sheet, such as paper, may be added with asphalt or some other suitable laminating adhesive serving to hold the assembly together. The adhesive material 456 may consist of asphalt or any other suitable adhesive mastic material filling the voids between the reinforcing elements 450. This results in the longitudinally extending reinforcing elements being held in position and the laminated assembly formed as a unitary structure.

In Figure 4 is shown a sheet 10 which may be paper with reinforcing elements transversely disposed. These elements have been saturated with adhesive applied to the sheet and then spread out to become thin bands and bonded to become permanently held to the sheet by the adhesive that is limited to the area of contact of the elements with sheet 10. Subsequently, sheet 470 had been applied to form a laminate using laminating medium 472 which may be asphalt or any other suitable material.

The newness of these products just described lies in the fact that either both sets of reinforcing elements are adhesively bonded firmly to the first sheet of paper and separated from the second sheet of paper by a laminating adhesive, or the first set of reinforcing elements is adhesively bonded permanently to the first sheet of material while the second set of reinforcing elements lies embedded in the laminating adhesive and are thus substantially loose relative to the sheet material. This looseness is a characteristic of old reinforced papers and especially of laminated structures. Where asphalt and other laminating adhesives have been used, the adhesive bond of the reinforcing elements to the sheet material or to the laminating adhesive has not been firm. Instead, it has been a feature of old laminated structures that the reinforcing elements be able to slide through the laminating adhesive without breaking. In contrast, it is an object of this invention to so bond all or part of the reinforcing elements to one or more than one web of material so that the web material or the reinforcing elements will fail rather than let the adhesive bond fail. A further variation involves a web of material having transversely placed reinforcing elements permanently bonded thereto and a second web of material such as paper having longitudinally placed reinforcing elements permanently bonded thereto and the two webs joined into a laminated structure by the use of asphalt or some other suitable laminating adhesive. One of the new advantages of applicant's laminated structures just described results from the thinness of the band-like reinforcing elements, which permit very much less laminating adhesive to be employed in order to obtain a completely united assembly and to obtain smooth flat surfaces on both sides of the laminate when that is a desired characteristic.

The adhesive may be applied to the sheet 454 in any suitable manner, as, for example, through a suitable brush 460 supplied with adhesive material through a suitable conduit 462.

In Figure 31 the device disclosed in Figures 28 and 29 is shown as used in applying longitudinally extending reinforcing elements 600 to a sheet of paper 10 having transversely disposed reinforcing elements 12 previously applied by the apparatus and the methods described in connection with the apparatus shown in Figure 15 or Figure 23, as the case may be, or any other suitable apparatus. By this arrangement, reinforcing material is provided that is reinforced in two directions having an appearance similar to the bottom sheet and the reinforcing elements shown in Figure 8 between the rollers 452 and 456, but the longitudinal reinforcing elements 600 are adhesively applied and spread with the apparatus disclosed in Figures 28 and 29, or similar apparatus. This material may be used as a wrapping material, it may be used in manufacturing bags, it may be used as reinforcing material applied to vulnerable areas of cartons or it may be cut on a bias into strips, so as to form stay tape reinforced in two directions, wherein the reinforcing elements are arranged at an angle of 45° with respect to the longitudinal axis, or whatever angle is used in cutting the sheet material on the bias.

The sheet material 10 described with the various types of reinforcing material described above may consist of conventional kraft paper. This type paper is practically non-elastic. The reinforcing elements, if they are made from filaments of nylon or some other synthetic materials, may have a considerable amount of elasticity relative to the paper. In certain types of carton assemblies and for many other usages, such as in protecting bales, packages, et cetera, a sheet material that has a certain amount of elasticity or a certain amount of give to it is desirable. Such a material has been disclosed in the modification disclosed in Figures 12 and 13. In this modification a creped paper 480, or some other type stretchable paper, may be used as a base sheet. If creped paper, it is preferably creped diagonally in two directions, as indicated by the diagonal crepe lines 482 and 484. This diagonally creped paper is commercially made and is known as X creped paper. When creped this way, the sheet can have considerable stretch, 20% or more, in the cross direction as well as in the longitudinal direction. Other types of creped paper prior to the X creped type provided stretch only in the longitudinal direction, which would be of little value in stay tapes, since the stretchable reinforcing elements are used to reinforce stay tape in the cross direction. Obviously, unless the paper can stretch in the cross direction together with the reinforcing elements, it is impossible to obtain the optimum value from a union of two stretchable materials which have approximately the same property of stretch. Reinforcing elements 486 are applied to one side by means of apparatus disclosed in the preferred embodiment, or one of the modifications that is suitable for this purpose. By utilizing diagonally disposed creped paper that is creped in two directions, the creped paper may be stretched in any direction without an immediate failure. This is advantageous especially when used in places where there may be a sudden impact force that would cause ordinary kraft paper to fail without a failure of an elastic material that could absorb the impact.

In Figure 34 creped paper 480, creped diagonally in two directions, is reinforced with reinforcing elements 602 and 604 extending at right angles to each other and parallel to the direction of creping of the paper 480. By this arrangement, the reinforcing elements are permitted to stretch in the direction of maximum stretch of the creped paper. This finished product may be used for a number of purposes. For example, it may be used in wrapping bulky articles having a rather irregular contour. It may be used in manufacturing bags, especially bags to fit odd shaped articles, where it is desirable to have the bag conform to the contour of the article packed therein. This material may also be used in the manufacture of stay tape, in which event it would be cut into strips of suitable width, say two inch strips or three inch strips, the reinforcing elements extending diagonally. One side or one portion of a side is coated with suitable adhesive material. In cases wherein the carton utilizing the stay tape is subjected to impact loads, the stay tape is provided with a relatively wide zone extending through the center that is not adhesively secured to the margins of the carton, for reasons that will be described more fully hereinafter. The stretchable materials of Figure 12 and Figure 34 might also be applied to cartons of Figure 32 and Figure 33. In the case of material in Figure 12, the reinforcing material is crosswise of the tape and in the case of Figure 34, the reinforcing elements are diagonal on the tape.

In Figure 13 the reinforced material, as disclosed in Figure 12, has been applied to the sides 490 of a carton. A space 492 in the corner forms a one-eighth inch wide gap where there is no carton material. This gap is spanned by the elastic reinforcing material 494, so with this gap only one-eighth inch wide, the amount that a stretchable stay tape can stretch is enough to permit a stay tape to better withstand a shock load that is evenly distributed over all the reinforcing elements, but the gap is too narrow to permit enough stretch of a stretchable tape to permit several reinforcing elements to co-operate to withstand a tension tearing force that is concentrated in a small area where only one or two reinforcing elements are placed. This material 494 may stretch, in that the reinforcing elements permit stretching and the creped paper permits stretching without failure. Kraft or stretchable paper may be provided with both transverse and longitudinal reinforcing elements applied to one side thereof, so as to have a network of reinforcing elements. In Figure 8, the bottom sheet 10 could consist of creped paper. The reinforcing elements could be applied by the apparatus described in connection with the disclosure in Figures 28 and 29.

In Figure 32 reinforced stay tape has been shown as applied to a corner of a carton with the reinforcing elements on the outside of the paper used as a backing sheet for the reinforcing elements. The paper may be kraft paper or it may be creped paper. For best results it should be creped paper. The center zone 610 bounded by the dotted lines 612 has no adhesive for securing the sheet material to the carton joint. The zones 614, one on either side, extending from the boundary line 612 to the outer edge of the sheet material are adhesively secured to the sides of the carton adjacent the joint. This arrangement is especially very strong to resist impact loads when creped paper, or other stretchable paper, is used, in that the creped paper and the reinforcing elements, especially if they have substantially the same elastic qualities, will expand in unison as a result of an impact load, thereby functioning as a resilient support for the margins of the carton. This has been found to give excellent results in withstanding impact loads and sudden jolts.

When desirable, a cover sheet may be added over the reinforcing elements and this will preferably be a stretchable material.

The important feature of this invention is to provide a substantially wide zone 610 that is unadhered to the carton, whether the yarns are in or out or part of a laminate, so that the stretch of the stretchable material will be enough to resist tension tear stresses. For example, if zone 610 is one inch wide and the materials have a 20% stretch factor, they can stretch one-fifth of an inch before breaking, thus allowing adjoining reinforcing elements to carry a part of the tension tear force applied to the vicinity of one or two elements. To explain this more fully, let us consider a tension tearing force of ten pounds applied to one end of a stretchable stay tape reinforced carton joint with a one inch wide area that is not glued to the carton and is thus free to stretch. Let us say that each reinforcing element is capable of stopping a four pound load and can stretch 20%. When the ten pound load is applied to the first reinforcing element, it would break if it could not stretch and thus pass on part of the load to the next reinforcing element. Even two elements of four pound strength would not stop the ten pound load, so by stretching further, the first element passes on an additional part of the load and the second element stretches so as to pass on part of the load. So with three or four elements sharing the load, a tension tear force can be stopped that would not be stopped by reinforcing elements of equal or greater strength but which cannot stretch adequately due to being glued non-stretchably to the carton sides. This feature does not occur when the width of the unadhered area is only one-eighth of an inch, since even when nylon yarn is used having a stretch of 20%, it has been found from tests where a tension tearing force is applied to one end of a stay tape reinforced carton join that the reinforcing elements spaced three to four per inch failed individually and not until this unadhered area was made several times wider or about one-half inch did the amount of stretch become adequate for more than one end of yarn to bear the load.

In Figure 33 the reinforcing elements have been applied directly to the margins of the carton with the paper 10 on the outside. The center zone 616 has no adhesive securing the reinforcing elements to the carton, the adhesive zones 618 rigidly securing the paper and the reinforcing elements to the sides of the carton. This zone 616 permits stretching of the stretchable stay tape to a considerable extent, since this zone may be one-half to one inch or so wide, so that with material having 20% stretch or so, a sufficient elasticity is provided so that in withstanding tension tear stresses, a number of reinforcing elements will share the force, whereas when materials having substantially no stretch are used, a tension tearing force breaks each reinforcing element alone without other reinforcing elements being able to assist the first element in withstanding the tension tearing force. Tests have been made on other stay tapes, such as clay filled cloth and duplex cloth tapes, and even though their stretch is relatively low, these tapes are capable of withstanding greater tension tear forces when a zone like 616 is provided where the stay tape is unadhered to the carton. In tests on tapes having almost no stretch, a zone like 616 did not improve test results. The greater the stretch of the stay tape, the narrower zone 616 may be. The amount of stretch may be referred to as a function of the length of the stretchable portion of the reinforcing element plus the elasticity thereof. The length of the stretchable portion of the reinforcing elements may be controlled by the width of the stretchable zone that is not adhered to the carton and it may be affected by arranging the reinforcing elements diagonally across the zone, as described in the disclosure shown in Figure 34. Reinforcing elements extending perpendicular to the joint or diagonally disposed reinforcing elements may be used.

In the event the reinforcing elements have not been spread so as to form a substantially continuous and uniform surface and in the event it is desirable to have the exposed surface of the reinforcing elements substantially flush with the backing sheet that forms a support for the reinforcing elements, it may be necessary to deboss the sheet material. One method for doing this has been disclosed in my copending application Serial No. 216,054, for Reinforced Sheet Material, Apparatus for and Method of Producing Same.

It has been found that by compressing the reinforced sheet like that shown in Figure 1 while moist, utilizing a rigid surface applied against the reinforced face of the sheet and the yieldable surface to the rear of the sheet for a sufficient period of time, the sheet may be formed into the contour shown in Figure 2. A low pressure may be used for accomplishing this operation. This result may be accomplished either by a continuous operation or by a series of operations utilizing a comparatively low pressure over a long period of time while the sheet material is caused to give off most of its water content. By utilizing low pressure, fragile reinforcing elements, such as glass fibers, may be used, without failure caused by the pressure of the debossing operation. A device for accomplishing this result by continuous low pressure will now be described.

This device includes a continuous belt 500 having a hard surface and passing over rollers 502 and 504. In addition to the rollers 502 and 504, the belt is supported upon a plurality of rollers 506 at closely spaced intervals, so that the upper surface of the belt 500 presents a firm substantially non-compressible and continuous surface.

A second belt 510 passes over rollers 512 and 514. These rollers are held in spaced relation by a pair of rails or frame members 516, only one of which has been shown. These rails may be adjusted away from and towards the belt 500 by means of a plurality of adjusting screws 520. The belt 510 may be made from sponge rubber or any other suitable yieldable material. A plurality of rolls 522 are used to hold the lower half of the belt 510 in proper spaced relation from the belt 500. Suitable driving mechanism is provided, which driving mechanism has not been shown, for driving the belts through the rollers supporting the belts.

A sheet 10 having reinforcing elements 12 projecting from one side thereof may be moistened in any suitable manner, preferably between the roll 530 and the nip of the belts. The sheet 10, together with the reinforcing elements thereon, are then fed between the belts for a sufficient distance, so as to cause the exposed surfaces of the reinforcing elements 12 to be flush with the surface of the paper 10 between the reinforcing elements. By applying a low pressure by means of the resilient belt 510, this is readily accomplished and by feeding the sheet material and the reinforcing elements between the belts a sufficient distance, so as to cause most of the moisture in the paper to be evaporated, the paper takes a permanent set. Only enough pressure is used to mold the moistened paper around the reinforcing elements during the drying of the paper. Once the moistened paper has been molded into its new form and dry set at room humidity, the flat reinforced surface of the assembly can not be destroyed merely by placing a tensile stress on the assembly that is perpendicular to the reinforcing elements. Tensile stresses of this kind have been applied to reinforced paper debossed in the manner disclosed herein and instead of destroying the smooth surface on the reinforced side, the paper itself has failed. This fact is considered significant, since prior art has described a debossing operation wherein the paper has apparently merely been wrapped around the reinforcing elements because the prior art admits that when a tensile force is applied to this debossed sheet, the reinforcing elements are popped out of their grooves and the smooth debossed reinforced side of the assembly is no longer smooth, since the reinforcing elements protrude above the paper surface after a tensile stress is applied. It may be desirable to apply heat in the space between one or both of the belts, that is, provide heat transfer elements either between the rolls 502 and 504 or between the rolls 512 and 514 or between both sets of rolls.

Due to the characteristic of certain types of sponge rubber being porous, moisture may readily be removed from the paper. The length of the belts depends upon the temperature used, the nature of the paper, the amount of water used, and the pressure used, as well as the humidity of the surrounding atmosphere. In a dry atmosphere, especially in the presence of heat, where the temperature is raised above the normal room temperature, the paper is dried quite rapidly.

The apparatus for reinforcing paper disclosed herein lends itself to a multiplicity of uses. It may be used when applying reinforcing paper strips in spaced relation from each other, as shown in Figure 1. The distance between the reinforcing strips may be controlled in various ways. One way to alter the distance between the reinforcing strips is to change the number of supply rolls. Another way of changing the spacing is to change the speed or rate of rotation of the gear ring 40. A third is to change the rate of speed at which the paper webs 10 are fed over the mandrel. Either one of these methods will change the relative spacing. Instead of using only one, a combination of two or more may be used.

Furthermore, the apparatus lends itself to the application of two or more types of reinforcing elements. The apparatus may be used for producing reinforced paper that is reinforced with paper strips, with textile reinforcing elements, or with yarn, or any desirable combination thereof.

In making transversely reinforced paper, the adhesive may be applied in any suitable manner. Instead of using a spray, the adhesive may be applied by a roll applicator, by capillary attraction, as, for example, a wick, by immersion, or by conveying the adhesive by a tube to one surface of the reinforcing material. In Figure 36 the adhesive is applied to the yarn by immersion. There may be an adhesive tank for each yarn or for a few yarns or for all the yarns, as disclosed in application Serial No. 179,302. Where more than one adhesive tank is used, the tanks must rotate in unison with the yarn supply packages, so as to permit wetting the yarns with adhesive prior to being applied transversely to the sheets of paper. In the event the adhesive is already applied to the reinforcing strips when withdrawn from the supply packages, the adhesive may be activated by water, or by a chemical solvent, or by heat, or a pressure sensitive adhesive may be used.

In Figure 35 mandrels, consisting of flat platen-like members 700 and 702, over which the paper 10 is fed through the reinforcing station, have been used instead of the mandrel disclosed in Figure 15. These mandrels, or platen-like members, are flat from side to side and are provided with slots having mounted therein rollers 704 cooperating with rollers 706 to flatten the substantially round, adhesively moistened, reinforcing elements 708 into flattened reinforcing elements 710. The rollers 704 and 706 may be driven so as to aid in feeding the paper over the platens or mandrels. By this arrangement, it is possible to spread the filaments of the reinforcing elements out into wide thin bands while the filaments are adhesively moistened.

The rollers 706, coming into contact with the reinforcing bands or elements, are preferably coated with "Teflon" or some other suitable material having substantially no affinity for the adhesive material used in securing the reinforcing elements to the paper or backing sheets. The platen-like members need not necessarily be parallel to each other, in that if three are used they form a triangle, if four are used they form a square. The number of platen-like members used determines the configuration of the assembly. Furthermore, flat platen-like members 700 and 702, not having slots, may be used to back up the sheets and small rollers or the equivalent thereof (see 370 in Figure 27) may be rotated around the longitudinal axis of the platens with these small rollers being moved across the width of the sheet parallel to the lay of the yarns and substantially perpendicular to the advance of the sheets of paper.

By applying a sufficient quantity of adhesive to the reinforcing elements before the reinforcing elements reach the paper, then as the reinforcing elements are applied to the paper applying a pressure directly to the adhesively moistened elements and prior to the setting of the adhesive, it is possible to squeeze surplus adhesive from the elements and spread this surplus adhesive over the surface between the elements, so as to provide a coating or laminating adhesive adapted to secure a second web of paper to said coating of laminating adhesive before the adhesive sets, this followed by the curing of the adhesive to bond the two sheets of paper to the reinforcing elements sandwiched between the two sheets of paper by the adhesive material to produce a laminated structure.

The adhesive used may be of a type and having the properties of quickly saturating the interstices between the filaments of the textile material so as to be carried by the textile material of the yarn in substantial quantity between the filaments and on their surfaces. This adhesive material has the property of lubricating a group of substantially untwisted textile members applied on a sheet of material in a manner to assist a pressure instrument to spread the group of substantially untwisted members to a width many times the thickness of the original group of filaments. This adhesive material should preferably be non-tacky to the surface of the pressure instrument and at the same time should have an adhesive affinity for the paper, so as to adhesively hold the filaments to the paper when spread out and pressed thereagainst. When the adhesive has set, the filaments are then permanently adhered to the paper sheet.

Although the laminated sheet material has been described in connection with either stay tape or longitudinal tape, the reinforced sheet material may be used for various other purposes, as, for example, the manufacture of bags, tags, labels, et cetera.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of adhesively securing a bundle of substantially untwisted filaments to a backing member that consists in relatively wetting the filaments and backing member with a liquid adhesive, applying the bundle to the backing member, applying a spreading force to the bundle while the adhesive is still liquid to thereby spread the filaments of the bundle on the backing member, and conditioning the adhesive to adhere the filaments to the backing member in substantially parallel relation to one another.

2. The method as in claim 1 in which the adhesive is applied as a coating on the backing member in amount sufficient to wet the fibres of the bundle when the same are applied to the backing member containing the adhesive.

3. The method as in claim 1 in which the fibres of the bundle are wetted with adhesive and then applied in said wetted condition to the backing member.

4. A method as in claim 1 in which the pressure is applied at a location that is stationary relative to the bundle as it is applied to the backing member whereby the fibres are spread out and secured to the backing member in substantially parallel relation to one another.

5. The method of adhesively securing a bundle of filaments to a backing member, the filaments of the bundle comprising a plurality of tiny, twisted yarns, the tiny, twisted yarns of the bundle being substantially untwisted relative to each other that consists in relatively wetting the bundle of tiny, twisted yarns and the backing member with a liquid adhesive, applying the bundle to the backing member, applying a force to the bundle while the adhesive is still liquid in a direction to spread the filaments of the bundle on the backing member, and conditioning the adhesive to adhere the filaments to the backing member in substantially parallel relation to one another.

References Cited in the file of this patent

UNITED STATES PATENTS

| | | |
|---|---|---|
| 885,322 | Maccallum | May 28, 1907 |
| 1,195,430 | Angier | Aug. 22, 1916 |
| 1,291,709 | Angier et al. | Jan. 21, 1919 |
| 1,362,066 | Wandel | Dec. 14, 1920 |
| 1,446,092 | Jackson | Feb. 20, 1923 |
| 1,460,392 | Schenkelberger | July 3, 1923 |
| 1,470,138 | Blumenthal | Oct. 9, 1923 |
| 1,494,970 | Wandel | May 20, 1924 |
| 1,679,721 | Howard | Aug. 7, 1928 |
| 1,844,838 | Buffington | Feb. 9, 1932 |
| 1,866,513 | Ballard | July 5, 1932 |
| 1,974,594 | Angier | Sept. 25, 1934 |
| 2,015,471 | Genuit | Sept. 24, 1935 |
| 2,024,224 | Humphner | Dec. 17, 1935 |
| 2,283,202 | Guyard | May 19, 1942 |
| 2,283,349 | Angier | May 19, 1942 |
| 2,293,246 | Fay | Aug. 18, 1942 |
| 2,311,857 | Noah et al. | Feb. 23, 1943 |
| 2,354,702 | Protz | Aug. 1, 1944 |
| 2,376,660 | Clark | May 22, 1945 |
| 2,521,055 | Foster | Sept. 5, 1950 |
| 2,604,424 | Mathes | July 22, 1952 |
| 2,604,426 | Beekman | July 22, 1952 |
| 2,610,936 | Carlson | Sept. 16, 1952 |
| 2,649,392 | Marshall | Aug. 18, 1953 |
| 2,651,588 | Bruce et al. | Sept. 8, 1953 |
| 2,653,090 | Crandall | Sept. 22, 1953 |
| 2,671,306 | Slayter | Mar. 9, 1954 |
| 2,674,556 | Pahl et al. | Apr. 6, 1954 |
| 2,699,389 | Crandall | Jan. 11, 1955 |

FOREIGN PATENTS

| | | |
|---|---|---|
| 470,558 | Germany | Jan. 19, 1929 |
| 718,627 | Great Britain | Nov. 17, 1954 |